United States Patent
Sato

(10) Patent No.: US 10,696,322 B2
(45) Date of Patent: Jun. 30, 2020

(54) CONTROL UNIT FOR VEHICLE AND CONTROL METHOD FOR VEHICLE

(71) Applicant: FUJI JUKOGYO KABUSHIKI KAISHA, Tokyo (JP)

(72) Inventor: Yutaka Sato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 827 days.

(21) Appl. No.: 15/378,628

(22) Filed: Dec. 14, 2016

(65) Prior Publication Data

US 2017/0210414 A1   Jul. 27, 2017

(30) Foreign Application Priority Data

Jan. 26, 2016   (JP) ................................ 2016-012521

(51) Int. Cl.
*B62D 6/00* (2006.01)
*B60W 10/08* (2006.01)
(Continued)

(52) U.S. Cl.
CPC ............. *B62D 6/003* (2013.01); *B60W 10/08* (2013.01); *B60W 10/20* (2013.01); *B60W 30/045* (2013.01); *B62D 5/0463* (2013.01); *B62D 5/0481* (2013.01); *B60K 7/0007* (2013.01); *B60K 17/043* (2013.01); *B60K 17/356* (2013.01); *B60K 2007/0061* (2013.01); *B60W 2510/244* (2013.01); *B60W 2710/083* (2013.01); *B60W 2710/202* (2013.01);
(Continued)

(58) Field of Classification Search
None
See application file for complete search history.

(56) References Cited

U.S. PATENT DOCUMENTS

2011/0307129 A1\*   12/2011   Yu .................... B60K 7/0007
                                                          701/22

FOREIGN PATENT DOCUMENTS

JP   2007-325372 A   12/2007
JP   2008-062699 A   3/2008
(Continued)

OTHER PUBLICATIONS

Office Action received for Japanese Patent application No. 2016-012521, dated Oct. 31, 2017, 4 ages of office action and 4 pages of English translation.

*Primary Examiner* — John Olszewski
*Assistant Examiner* — Gerrad A Foster
(74) *Attorney, Agent, or Firm* — Chip Law Group

(57) ABSTRACT

A control unit for a vehicle includes: a vehicle additional yaw moment calculator that calculates a vehicle additional yaw moment to be applied to a vehicle based on a yaw rate of the vehicle; a steering torque instructing module that instructs an assist torque of a steering operation of a steering system; a left-right driving force torque instructing module that instructs a left-right wheel driving torque which applies a moment to the vehicle independently of the steering system; a charging state acquisition module that acquires a state of charge of a battery which stores an electric power serving as a driving source for applying the vehicle additional yaw moment; and an adjuster that adjusts the assist torque and the left-right wheel driving torque based on the state of charge to apply the vehicle additional yaw moment.

11 Claims, 21 Drawing Sheets

(51) Int. Cl.
  *B60W 10/20*   (2006.01)
  *B60W 30/045*   (2012.01)
  *B62D 5/04*   (2006.01)
  *B60K 7/00*   (2006.01)
  *B60K 17/04*   (2006.01)
  *B60K 17/356*   (2006.01)

(52) U.S. Cl.
  CPC .... *B60W 2720/406* (2013.01); *B60Y 2400/61* (2013.01); *Y02T 10/7258* (2013.01)

(56) References Cited

FOREIGN PATENT DOCUMENTS

| | | |
|---|---|---|
| JP | 2009-220617 A | 10/2009 |
| JP | 2014-183686 A | 9/2014 |

\* cited by examiner

CONTROL UNIT FOR VEHICLE AND CONTROL METHOD FOR VEHICLE

CROSS-REFERENCE TO RELATED APPLICATIONS

The present application claims priority from Japanese Patent Application No. 2016-012521 filed on Jan. 26, 2016, the entire contents of which are hereby incorporated by reference.

BACKGROUND

1. Technical Field

The present invention relates to a control unit for a vehicle and a control method for a vehicle.

2. Related Art

For example, Japanese Unexamined Patent Application Publication (JP-A) No. 2007-325372 has disclosed that an electric vehicle is controlled which includes a first motor that drives a primary driving wheel, a second motor that drives a secondary driving wheel, and a battery, the state of charge (SOC) and temperature of the electric battery are checked to determine whether it is possible to perform driving force distribution control, and the required torque of the second motor is decreased in the low SOC, and then the required torque of the first motor is decreased.

Turning driving force control to be performed by the motors, which uses the difference between left and right driving forces, is performed with the power of a high-voltage battery. The state of charge (SOC) of the high-voltage battery, however, makes a difference in the performance of the driving force control. Especially if the state of charge of the high-voltage battery lowers during a turn, it is impossible to perform turn assist control by performing the driving force control. Accordingly, a driver has to turn the steering wheel more or perform a deceleration operation. In such a case, the driver is required to respond in a shorter time in proportion to the vehicle velocity, and thus the driver would be requested to perform a complicated steering operation at medium to high vehicle velocity.

The technology described in JP-A No. 2007-325372 controls front and rear wheel torque distribution by using the output torques of the first motor and the second motor, but does not consider the turning driving force control, which uses the difference between left and right driving forces. Nothing is thus taken into consideration about compensating for the turn assist control by performing the driving force control if the state of charge of the high-voltage battery lowers during a turn. It is difficult in this case to compensate for the turn assist control by performing the driving force control.

SUMMARY OF THE INVENTION

It is desirable to provide a novel and improved control unit for a vehicle and control method for a vehicle which can achieve a desired turn even if the amount of charge of the battery lowers for performing turning driving force control, which uses the difference between left and right driving forces.

An aspect of the present invention provides a control unit for a vehicle, the control unit including: a vehicle additional yaw moment calculator that calculates a vehicle additional yaw moment to be applied to a vehicle based on a yaw rate of the vehicle; a steering torque instructing module that instructs an assist torque of a steering operation of a steering system; a left-right driving force torque instructing module that instructs a left-right wheel driving torque which applies a moment to the vehicle independently of the steering system; a charging state acquisition module that acquires a state of charge of a battery which stores an electric power serving as a driving source for applying the vehicle additional yaw moment; and an adjuster that adjusts the assist torque and the left-right wheel driving torque based on the state of charge to apply the vehicle additional yaw moment.

The adjuster may reduce the left-right wheel driving torque and increase the assist torque as the amount of charge of the battery lowers.

The adjuster may set the left-right wheel driving torque to 0 when the amount of charge of the battery is equal to or lower than a predetermined value.

The control unit for a vehicle may further include: a predicted slip angle calculator that calculates a predicted slip angle of the vehicle; a turnable slip angle calculator that calculates a turnable slip angle based on a maximum turning radius obtained from driving forces of wheels for applying the vehicle additional yaw moment; and a slip angle change rate calculator that calculates a slip angle change rate that is a ratio of the predicted slip angle to the turnable slip angle. The adjuster may adjust the assist torque and the left-right wheel driving torque based on the state of charge and the slip angle change rate.

The adjuster may reduce the left-right wheel driving torque and increase the assist torque as the slip angle change rate increases.

When the slip angle change rate is equal to or higher than a predetermined value and the amount of charge of the battery is equal to or greater than a predetermined value, the adjuster may set the left-right wheel driving torque among torques for applying the vehicle additional yaw moment as an outputtable maximum torque, and set a remaining as the assist torque.

The predicted slip angle calculator may include a first predicted slip angle calculator that calculates a first predicted slip angle based on a first predicted turning radius calculated based on a lane detected by a camera, and a second predicted slip angle calculator that calculates a second predicted slip angle based on a second predicted turning radius calculated based on a steering wheel angle, the slip angle change rate calculator may include a first slip angle change rate calculator that calculates a first slip angle change rate that is a ratio of the first predicted slip angle to the turnable slip angle, and a second slip angle change rate calculator that calculates a second slip angle change rate that is a ratio of the second predicted slip angle to the turnable slip angle, the control unit may further include a slip angle change rate determiner that compares the first slip angle change rate and the second slip angle change rate and determines a higher rate as a slip angle change rate, and the adjuster may adjust the assist torque and the left-right wheel driving torque based on the state of charge and the slip angle change rate determined by the slip angle change rate determiner.

The control unit for a vehicle may further include: a slip determiner that determines a slip of the vehicle. When the vehicle is determined to have slipped, the adjuster may reduce the left-right wheel driving torque and increase the assist torque.

The control unit for a vehicle may further include: a target yaw rate calculator that calculates a target yaw rate of the vehicle; a vehicle yaw rate calculator that calculates a yaw rate model value from a vehicle model; a yaw rate sensor that detects an actual yaw rate of the vehicle; and a feedback yaw rate calculator that calculates a feedback yaw rate from the yaw rate model value and the actual yaw rate by distributing the yaw rate model value and the actual yaw rate based on a difference between the yaw rate model value and the actual yaw rate. The vehicle additional yaw moment calculator may calculate the vehicle additional yaw moment based on a difference between the target yaw rate and the feedback yaw rate.

The target yaw rate calculator may include a first target yaw rate calculator that calculates a first target yaw rate from an image of a camera and a second target yaw rate calculator that calculates a second target yaw rate based on a steering wheel angle and a vehicle velocity, and calculate the target yaw rate based on the first target yaw rate and the second target yaw rate.

Another aspect of the present invention provides a control method for a vehicle, the control method including: calculating a vehicle additional yaw moment to be applied to a vehicle based on a yaw rate of the vehicle; instructing an assist torque of a steering operation of a steering system; instructing a left-right wheel driving torque which applies a moment to the vehicle independently of the steering system; acquiring a state of charge of a battery which stores an electric power serving as a driving source for applying the vehicle additional yaw moment; and adjusting the assist torque and the left-right wheel driving torque based on the state of charge to apply the vehicle additional yaw moment.

BRIEF DESCRIPTION OF THE DRAWINGS

FIG. 8 is a schematic diagram illustrating a gain map used when a weighting gain calculator calculates a weighting gain a;

DETAILED DESCRIPTION

Figure 1:
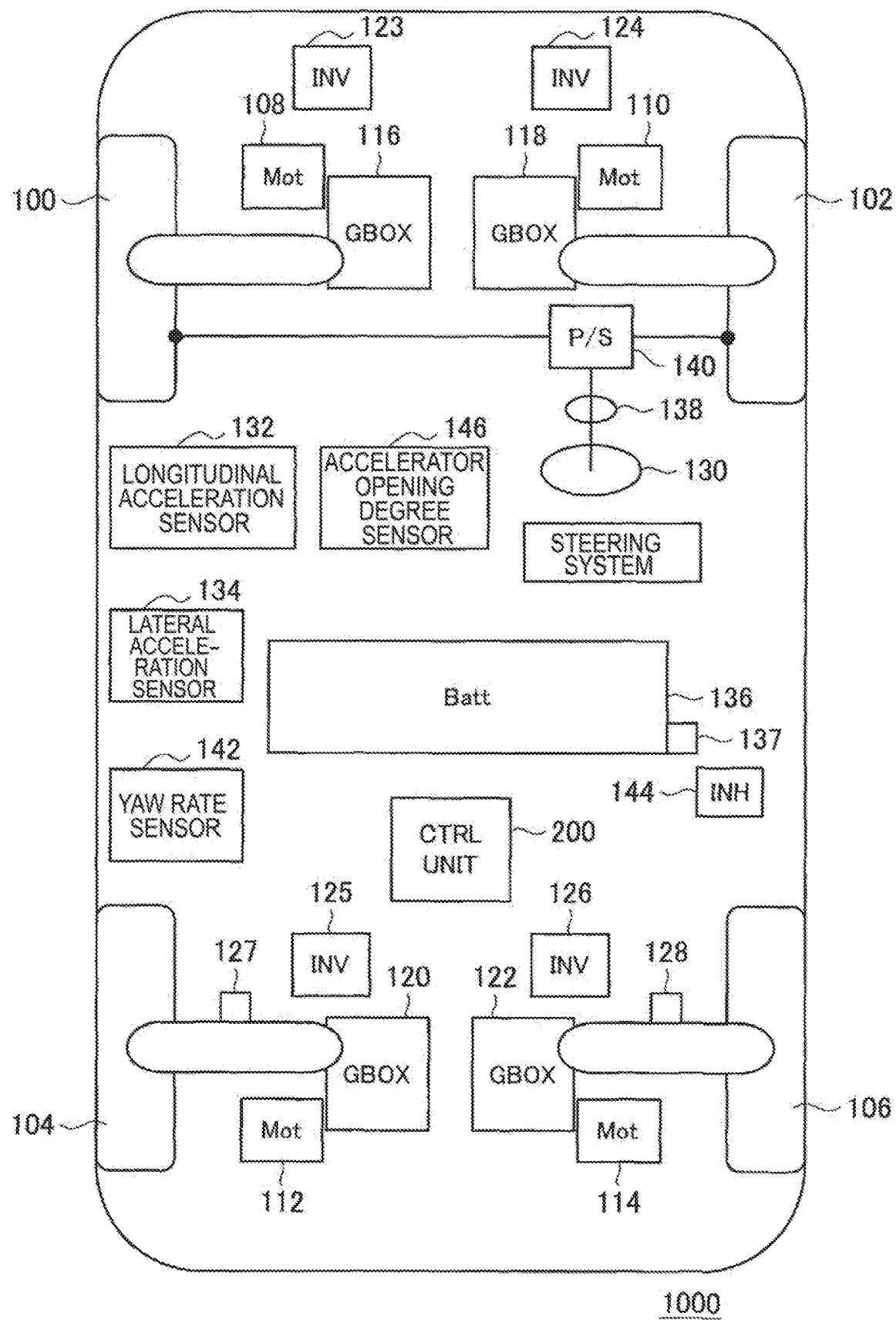
FIG. 1 is a schematic diagram illustrating a vehicle according to an implementation of the present invention.

Hereinafter, preferred implementations of the present invention will be described in detail with reference to the appended drawings. Note that, in this specification and the appended drawings, structural elements that have substantially the same function and structure are denoted with the same reference numerals, and repeated description of these structural elements is omitted.

First of all, the structure of a vehicle 1000 according to an implementation of the present invention will be described with reference to FIG. 1. FIG. 1 is a schematic diagram illustrating the vehicle 1000 according to the present implementation. As illustrated in FIG. 1, the vehicle 1000 includes front wheels 100 and 102, rear wheels 104 and 106, driving force generators (i.e., motors) 108, 110, 112, and 114 that respectively drive the front wheels 100 and 102 and the rear wheels 104 and 106, gearboxes 116, 118, 120, and 122 that respectively transfer the driving forces of the motors 108, 110, 112, and 114 to the front wheels 100 and 102 and the rear wheels 104 and 106, inverters 123, 124, 125, and 126 that respectively control the motors 108, 110, 112, and 114, wheel speed sensors 127 and 128 that respectively detect the wheel speeds (i.e., vehicle velocity V) of the rear wheels 104 and 106, a steering wheel 130 that steers the front wheels 100 and 102, a longitudinal acceleration sensor 132, a lateral acceleration sensor 134, a battery 136, a charging state acquisition module that acquires the state of charge (SOC) of the battery, a steering wheel angle sensor 138, a power steering mechanism 140, a yaw rate sensor 142, an inhibitor position sensor (IHN) 144, an accelerator opening degree sensor 146, and a control unit (i.e., a controller) 200.

The vehicle 1000 according to the present implementation is equipped with the motors 108, 110, 112, and 114 for respectively driving the front wheels 100 and 102 and the rear wheels 104 and 106. Accordingly, it is possible to control the driving torque at each of the front wheels 100 and 102 and the rear wheels 104 and 106. Therefore, performing left-right driving force control on each of the front wheels 100 and 102 and the rear wheels 104 and 106 can generate a yaw rate through torque vectoring control independently of generation of a yaw rate by steering of the front wheels 100 and 102, and assistance in a steering operation can thus be provided. In other words, in the vehicle 1000 according to the present implementation, turn assist control is carried out, that is, assistance in the steering operation is provided by controlling a turning moment (hereinafter referred to also as a yaw moment) based on a vehicle-turning angular velocity (hereinafter referred to as a yaw rate).

The driving of the motors 108, 110, 112, and 114 is controlled by controlling the inverters 123, 124, 125, and 126 corresponding to the motors 108, 110, 112, and 114, respectively, based on instructions from the control unit 200. The driving forces of the motors 108, 110, 112, and 114 are transferred to the front wheels 100 and 102 and the rear wheels 104 and 106, respectively, through the respective gearboxes 116, 118, 120, and 122. Each of the motors 108, 110, 112, and 114 and the inverters 123, 124, 125, and 126 used in the vehicle 1000 is highly responsive, and the vehicle 1000 is capable of driving the right and left wheels independently. In the vehicle 1000 as described above, the turning moment (i.e., the yaw moment) can be controlled based on the vehicle-turning angular velocity (i.e., the yaw rate) to carry out the turn assist control, that is, to provide assistance in the steering operation.

The power steering mechanism 140 controls the steering angles of the front wheels 100 and 102 through torque control or angle control in accordance with an operation of the steering wheel 130 by a driver. The steering wheel angle sensor 138 measures a steering wheel angle θh input by the driver operating the steering wheel 130. The yaw rate sensor 142 measures an actual yaw rate γ of the vehicle 1000. The wheel speed sensors 127 and 128 measure the vehicle velocity V of the vehicle 1000.

Note that the present invention is not limited to the above implementation, and that a vehicle according to another implementation of the present invention may be designed so that only the rear wheels 104 and 106 can generate driving forces independently. Also note that the present invention is not limited to the torque vectoring control with driving force control, and that another implementation of the present invention may be applied to, for example, a four-wheel steering system in which the steering angles of the rear wheels are controlled.

Figure 2:
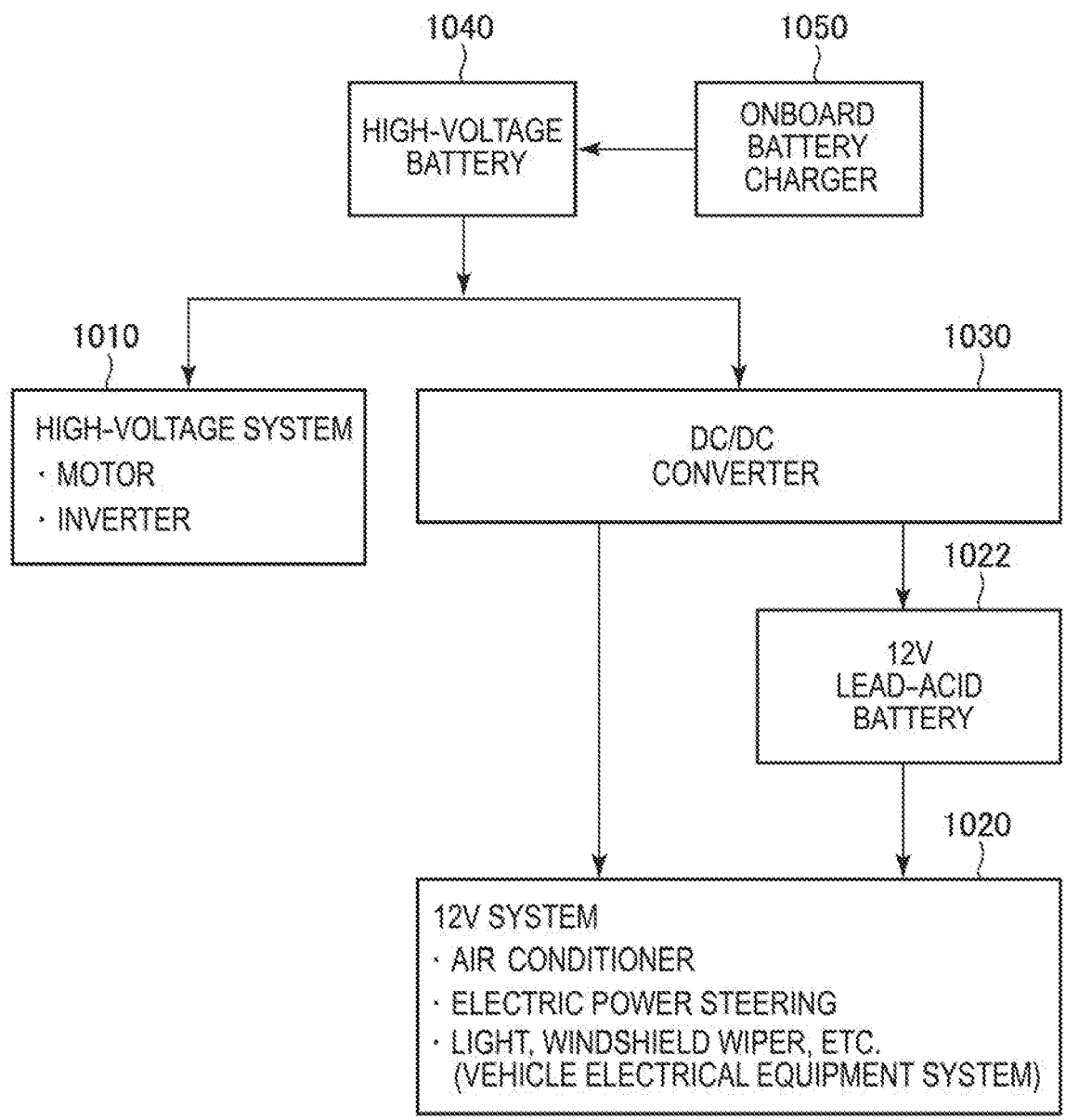
FIG. 2 is a schematic diagram illustrating a structure of a vehicle including a high-voltage system and a 12V system.

FIG. 2 is a schematic diagram illustrating the structure of the vehicle 1000 including a high-voltage system 1010 and a 12V system 1020. The high-voltage system 1010 includes the above-described motors 108, 110, 112, and 114, and inverters 123, 124, 125, and 126 for driving the vehicle 1000. Meanwhile, the 12V system 1020 includes a vehicle electrical equipment system such as an air conditioner, an electric power steering wheel, lights, and a windshield wiper. As illustrated in FIG. 2, the vehicle 1000 includes a high-voltage battery 1040 that supplies power to the high-voltage system 1010, a DC/DC converter 1030 that converts the voltage of the high-voltage battery 1040 and supplies power to the 12V system 1020, a 12V lead-acid battery 1022, and an onboard battery charger 1050.

As illustrated in FIG. 2, the power supply system of a vehicle such as an HEV and an EV includes two types of systems: the 12V system 1020; and the high-voltage system 1010. The lead-acid battery 1022 is used as a buffer, and the voltage from the high-voltage battery 1040 is stepped down by the DC/DC converter 1030, thereby supplying power to the 12V system 1020. Accordingly, generators (such as alternators and dynamos) of vehicles driven by conventional internal combustion engines are not mounted.

Figure 3:
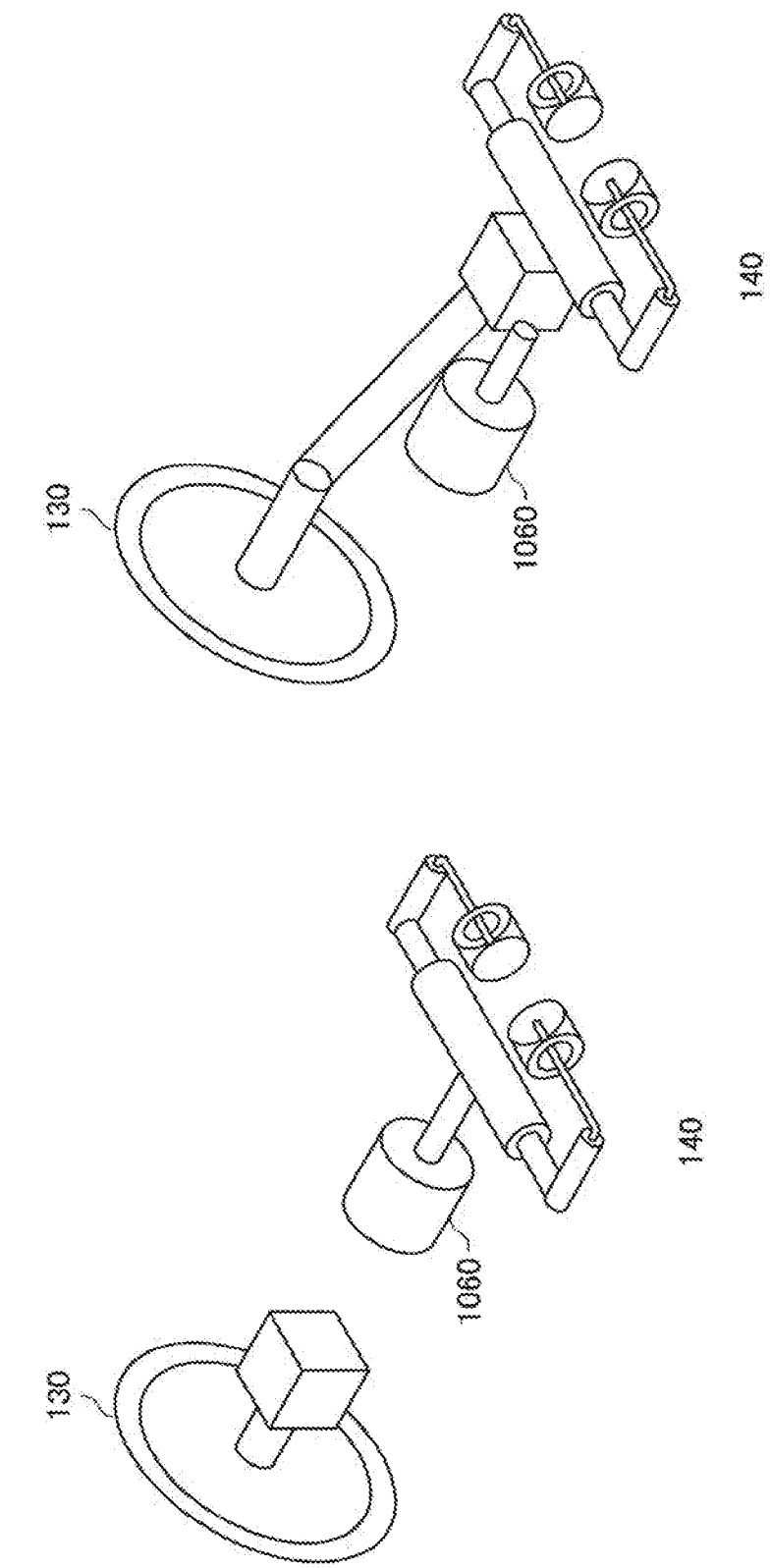
FIG. 3 is a schematic diagram illustrating a power steering mechanism included in the vehicle according to the present implementation.

FIG. 3 is a schematic diagram illustrating the power steering mechanism 140 (steering system) included in the vehicle 1000 according to the present implementation. The vehicle 1000 according to the present implementation includes a steer-by-wire system or an active steering system as illustrated in FIG. 3 as the steering system. A front wheel is steered by the driving force of an electric power steering motor 1060, and the electric power steering motor 1060 is driven by power obtained by the DC/DC converter 1030 stepping down the voltage of the high-voltage battery 1040 in any of the systems. The control over the torque of the electric power steering motor 1060 makes it possible to change how much the vehicle 1000 turns in accordance with a predetermined steering operation amount of the driver.

If the vehicle 1000 structured as described above carries out a turn only using a steering wheel operation during its turning, efficiency in conversion is exhibited when the DC/DC converter 1030 performs step-down, which affects power and fuel costs resulting from efficiency in internal power conversion.

The driving force control to be performed by the motors 108, 110, 112, and 114, which uses the difference between left and right driving forces, is performed by the power of the high-voltage battery 1040, but the state of charge (SOC) of the high-voltage battery 1040 makes a difference in the performance of the driving force control. In one implementation, the high-voltage battery 1040 may serve as a "driving source". If the state of charge of the high-voltage battery 1040 lowers during a turn, it is not possible to perform the turn assist control by performing the driving force control. Accordingly, a driver has to turn the steering wheel more or perform a deceleration operation. In this case, the driver is required to respond in a shorter time in proportion to the vehicle velocity, and thus the driver would be requested to perform a complicated steering operation at medium to high vehicle velocity.

Accordingly, if the state of charge of the high-voltage battery 1040 lowers, the turn control to be performed by the left-right driving force distribution of the motors 108, 110, 112, and 114 is switched to steering wheel control to be performed by the electric power steering motor 1060 to increase the torque of the electric power steering motor 1060 in the present implementation. This causes the vehicle 1000 to turn more in accordance with a predetermined steering operation amount of the driver.

Performing the driving force control to be performed by the motors 108, 110, 112, and 114, which uses the difference between left and right driving forces, can cause the vehicle 1000 to slip and to behave unstably in the condition such as a road surface having a low p on which the vehicle 1000 is likely to slip. The turn control to be performed by the left-right driving force distribution of the motors 108, 110, 112, and 114 on the basis of the slip angle of the vehicle 1000 is thus switched to the steering wheel control to be performed by the electric power steering motor 1060 as appropriate in the present implementation. When a slip occurs, the driving force control to be performed by the motors 108, 110, 112, and 114, which uses the difference between left and right driving forces, switches to control to be performed by the motor torque of the electric power steering motor 1060, achieving a predetermined turn and makes the vehicle behavior stable.

Figure 4:
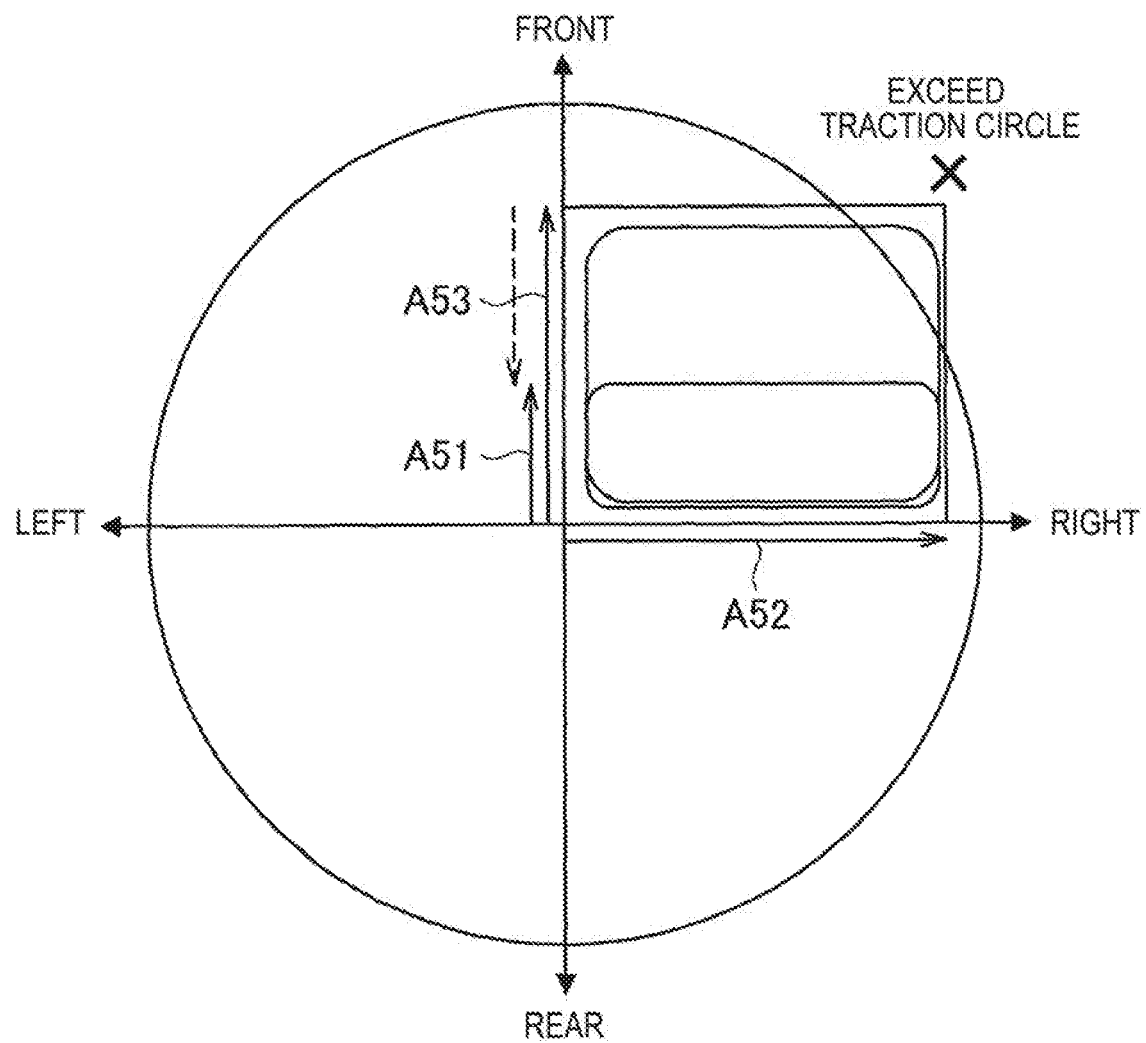
FIG. 4 is a schematic diagram illustrating a traction circle characteristic of a tire when a slip occurs.

FIG. 4 is a schematic diagram illustrating the traction circle characteristic of a tire when a slip occurs, and illustrates the relationship of the longitudinal forces and lateral forces of the rear wheels 106 and 108. The stabilization of the behavior of the vehicle 1000 will now be described in detail below with reference to FIG. 4.

With regard to the characteristic indicating the relationship of the longitudinal forces and lateral forces of the rear wheels 106 and 108 (which will also be referred to as the traction circle characteristic of a tire hereinbelow), when a turn is performed based on left-right driving force distribution and longitudinal forces are thus generated to the arrow A51 of the longitudinal axis illustrated in FIG. 4, the width of the arrow A52 of the lateral axis is an acceptable level of the lateral forces. If the longitudinal forces increase to the arrow 53 in that state, it exceeds the traction circle, and thus a slip occurs. Thus, when a slip occurs due to a turn based on left-right driving force distribution, the turn is achieved by switching control to angular control of a steering wheel angle and controlling torques of the electric power steering motor 1060. Accordingly, the longitudinal forces return to the arrow 51, and thus occurrences of a slip can be minimized. When, for example, a right turn is carried out based on left-right driving force distribution and the amount of the right turn in that direction is insufficient due to a slip of the vehicle 1000, an assist torque from the electric power steering motor 1060 is applied on the right turn side.

Figure 5:
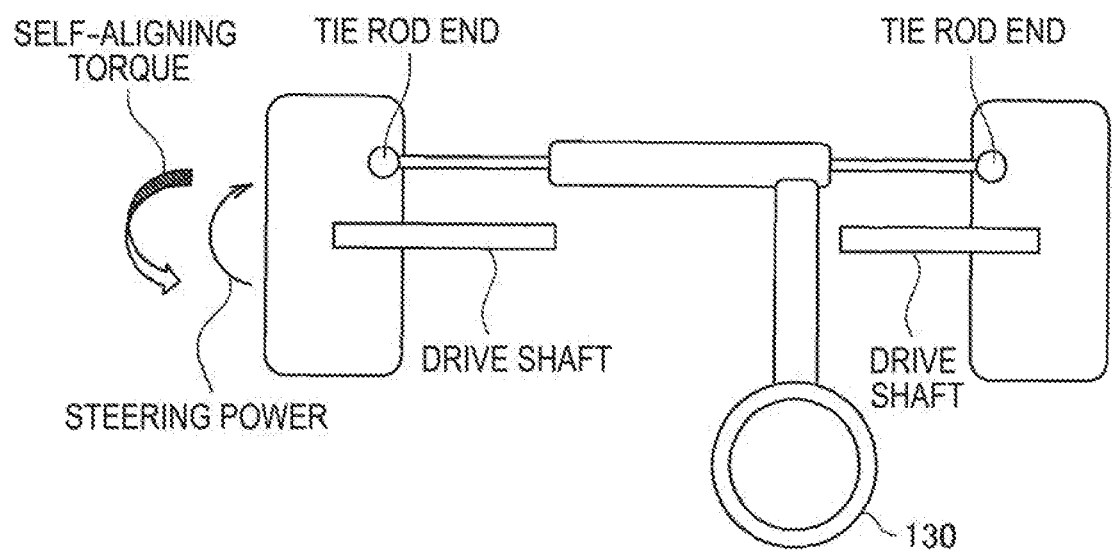
FIG. 5 is a schematic diagram illustrating a technique of calculating a torque of an electric power steering motor.

FIG. 5 is a schematic diagram illustrating a technique of calculating a torque of the electric power steering motor 1060. A torque of the electric power steering motor 1060 can be obtained by adding a self-aligning torque, a torque obtained from a distance between a tire-turn center point and a tie rod, and a torque around a tire calculated by converting a steering angle of an indicated tier into an angular acceleration and multiplying it by inertia for tier steering, and then dividing the addition result by a steering gearbox ratio. Note that details of this calculation method for a torque of the electric power steering motor 1060 will be described below.

Considering the point of view described above, a mechanism to be used for a turn is selected according to a state of a load of power supply of the 12V system 1020 and the state of charge (SOC) of the high-voltage battery 1040 in the present implementation. In addition, a turn is carried out through left-right driving forces in areas in which turn assist is possible based on left-right driving forces due to a predicted turn traveling track based on outside recognition and a steering operation. Details thereof will be described below.

Figure 6:
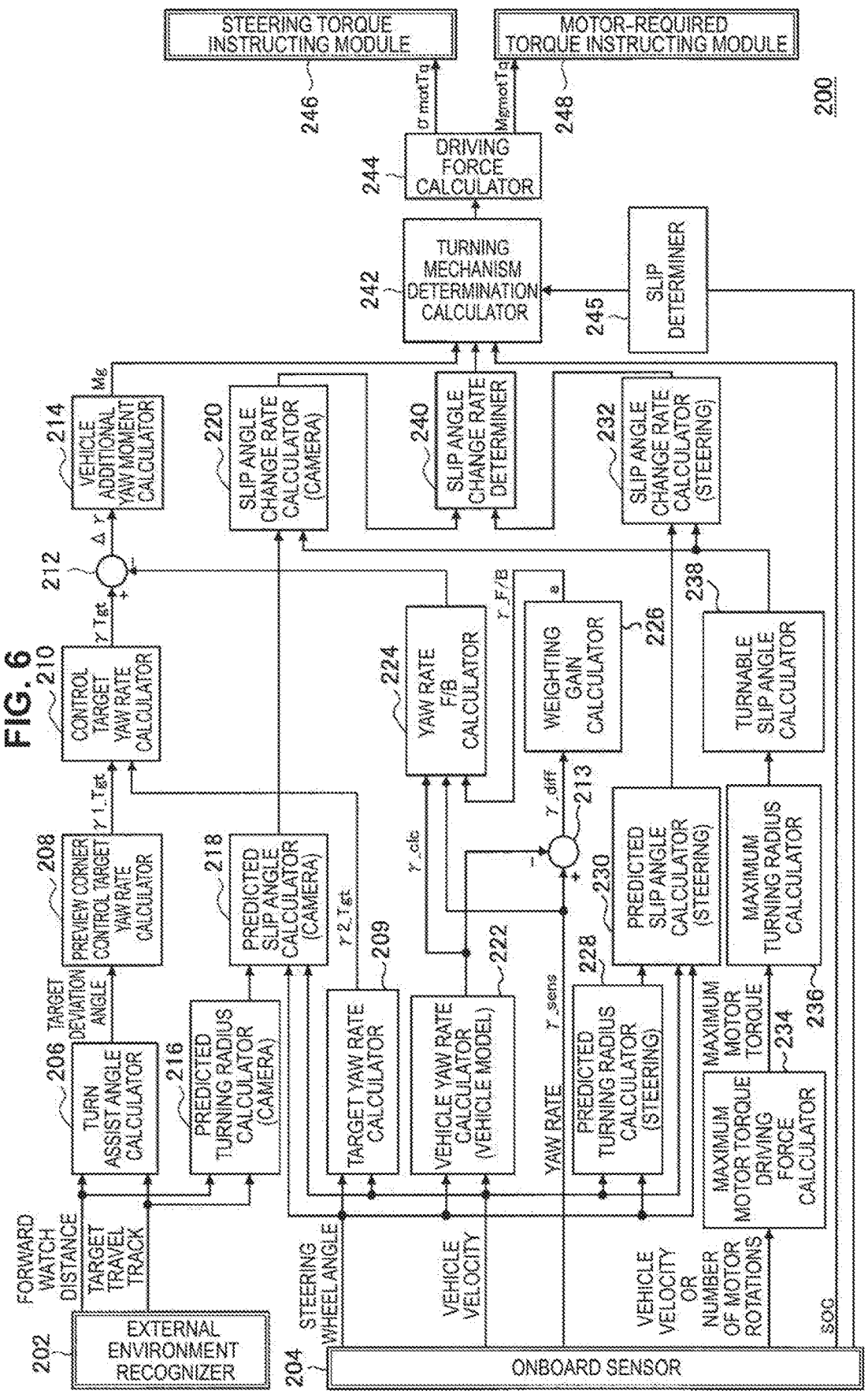
FIG. 6 is a schematic diagram illustrating structures of a control unit and surrounding components according to the present implementation in detail.

FIG. 6 is a schematic diagram illustrating structures of the control unit 200 and surrounding components according to the present implementation in detail. The control unit 200 has an external environment recognizer 202, an onboard sensor 204, a turn assist angle calculator 206, a preview corner control target yaw rate calculator 208, a target yaw rate calculator 209, a control target yaw rate calculator 210, subtractors 212 and 213, a vehicle additional yaw moment calculator 214, a predicted turning radius calculator 216, a predicted slip angle calculator 218, a slip angle change rate calculator 220, a vehicle yaw rate calculator 222, a yaw rate F/B calculator 224, a weighting gain calculator 226, another predicted turning radius calculator 228, another predicted slip angle calculator 230, another slip angle change rate calculator 232, a maximum motor torque driving force calculator 234, a maximum turning radius calculator 236, a turnable slip angle calculator 238, a slip angle change rate determiner 240, a turning mechanism determination calculator 242, a driving force calculator 244, a slip determiner 245, a steering torque instructing module 246, and a motor-required torque instructing module 248.

In FIG. 6, the onboard sensor 204 includes the wheel speed sensors 127 and 128, the longitudinal acceleration sensor 132, the lateral acceleration sensor 134, the steering wheel angle sensor 138, the yaw rate sensor 142, and the accelerator opening degree sensor 146, all of which have been mentioned above. The steering wheel angle sensor 138 measures the steering wheel angle θh of the steering wheel 130. In addition, the yaw rate sensor 142 measures the actual yaw rate γ of the vehicle 1000, and the wheel speed sensors 127 and 128 measure the vehicle velocity V. The lateral acceleration sensor 134 measures the lateral acceleration Ay of the vehicle 1000.

The target yaw rate calculator 209 calculates a target yaw rate γ_tgt based on the steering wheel angle θh and the vehicle velocity V. More specifically, the target yaw rate calculator 209 calculates the target yaw rate γ_tgt using eq. (1) below, which represents a common two-dimensional two-wheel model. The target yaw rate γ_tgt is calculated by substituting values calculated from Eqs. (2) and (3) below into the right side of Eq. (1). The calculated target yaw rate γ_tgt is input to the subtractor 212.

$$\gamma\_tgt = \frac{1}{1+TS} \times G^{\gamma}_{\delta}(0)_{tgt} \times \frac{\theta h}{N} \quad (1)$$

$$G^{\gamma}_{\delta}(0)_{tgt} = \frac{1}{1+A_{tgt}V^2} \times \frac{V}{l} \quad (2)$$

$$A_{tgt} = \frac{m}{2l} \times \frac{l_f \times K_{ftgt} + l_r \times K_{rtgt}}{K_{ftgt} \times K_{rtgt}} \quad (3)$$

Note that the variables, the constants, and the operator in Eqs. (1) to (3) are as follows.
γ_tgt: the target yaw rate
θh: the steering wheel angle
V: the vehicle velocity
T: a time constant of the vehicle
S: a Laplace operator
N: a steering gear ratio
l: a vehicle wheelbase
$l_f$: the distance from the center of gravity of the vehicle to a front wheel center
$l_r$: the distance from the center of gravity of the vehicle to a rear wheel center
m: the weight of the vehicle
$K_{ftgt}$: target cornering power (the front wheels)
$K_{rtgt}$: target cornering power (the rear wheels)

As shown above, the target yaw rate γ_tgt is calculated from Eq. (1) with the vehicle velocity V and the steering wheel angle θh as the variables. The constant $A_{tgt}$ in Eq. (2) is a constant that represents characteristics of the vehicle, and is calculated from Eq. (3).

The external environment recognizer 202 is a component for recognizing the external environment. In addition, the external environment recognizer 202 includes a stereo camera assembly. The stereo camera assembly included in the external environment recognizer 202 images the vehicle outside, and acquires image information of the vehicle outside (image information, in particular, of the road surfaces in front of the vehicle, lanes indicating driving lanes, preceding vehicles, traffic lights, and various traffic signs). The stereo camera assembly includes a symmetrical pair of cameras equipped with image sensors such as a CCD sensor and a CMOS sensor, and images the external environment of the vehicle outside to acquire image information.

Based on the principle of triangulation, the external environment recognizer 202 can generate and acquire distance information on the distance to a target object (such as a preceding vehicle) from the disparities of the corresponding positions in a symmetrical pair of images obtained by the symmetrical pairs of cameras imaging the areas in the vehicle traveling direction. In addition, the external environment recognizer 202 can detect three-dimensional object data, lane line data, and the like by performing well-known grouping processing on the distance information generated on the basis of the principle of triangulation, and then comparing the distance information subjected to the grouping processing with preset three-dimensional object data and the like. This also allows the external environment recognizer 202 to recognize lanes indicating driving lanes, stop signs, stop lines, ETC gates, and the like.

Figure 7:
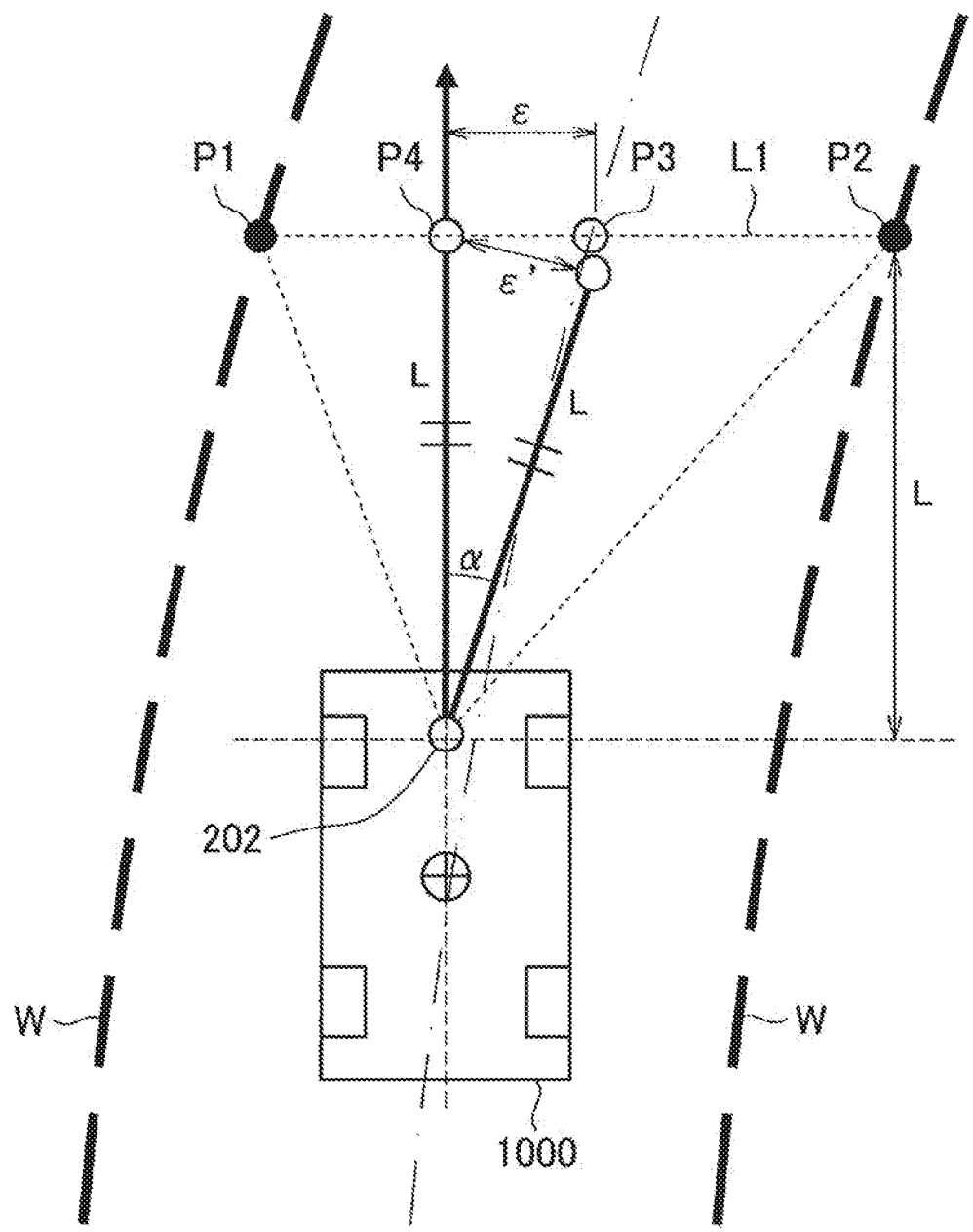
FIG. 7 is a schematic diagram for describing a method for an external environment recognizer to calculate a lateral deviation ε from a path of travel.

FIG. 7 is a schematic diagram for describing a method for the external environment recognizer 202 to calculate a lateral deviation ε from a path of travel. As illustrated in FIG. 7, the external environment recognizer 202 detects lane lines W of a travel lane in which the vehicle 1000 travels, and obtains coordinates of the lane lines at the intersections P1 and P2 at which the lane lines W intersect the straight line L1, which is a forward watch point distance L away from the external environment recognizer 202 in its forward direction with respect thereto. Then, coordinates of the path of travel at an intermediate point P3 between the intersections P1 and P2 are obtained. In addition, coordinates of an intersection P4 (the forward watch point) at which the straight line L1 intersects the forward direction of the external environment recognizer 202 are obtained. Because a deviation ε' from the path of travel can approximate the lateral deviation ε between the target path of travel and the vehicle forward watch point (the distance between P3-P4), ε' is replaced by ε.

The turn assist angle calculator 206 calculates a parameter corresponding to an amount of steering (which is a turn assist angle α [rad]) from the forward watch point distance L and the lateral deviation ε between the target path of travel and the vehicle forward watch point detected by the external environment recognizer 202 in advance. The turn assist angle α can be calculated from the following Eq. (4).

$$\alpha = 2 \times \sin^{-1}(\varepsilon/2L) \quad (4)$$

In addition, the turn assist angle calculator 206 calculates a turn assist angle target value αTgt by multiplying the turn assist angle α by a predetermined tuning gain (a constant).

When the amount of steering of the steering wheel 130 is insufficient at the time of advance into or traveling around a corner, rear torque vectoring control (driving assist control) is performed using the turn assist angle target value αTgt. Thus, the preview corner control target yaw rate calculator 208 obtains a driving assist control target yaw rate γ2_Tgt by setting the turn assist angle target value αTgt to θh/N of Eq. (1) of a two-dimensional 2-wheel model.

A driving stability control target yaw rate γ1_Tgt calculated by the control target yaw rate calculator 210 and the driving assist control target yaw rate γ2_Tgt calculated by the preview corner control target yaw rate calculator 208 are input to the control target yaw rate calculator 210 together. When a direction of a steering operation of the driver and a direction of an estimated path of travel recognized by the external environment recognizer 202 are the same based on a steering wheel angle θh of the steering wheel 130 and the lateral deviation ε from the path of travel, the control target yaw rate calculator 210 selects one from the input γ1_Tgt and γ2_Tgt, which has a higher gain, as a control target yaw rate γTgt, and outputs it to the subtractor 212.

In addition, when the direction of steering operated by the driver and the direction of the estimated path of travel recognized by the external environment recognizer 202 are opposite to each other based on the steering wheel angle θh of the steering wheel 130 and the lateral deviation ε from the path of travel, the control target yaw rate calculator 210 ascertains that the driver intends to move to a direction different from the path of travel estimated by the external environment recognizer 202. In this case, the control target yaw rate calculator 210 selects the driving stability control target yaw rate γ1_Tgt as the control target yaw rate γTgt in the state in which an amount of steering of the steering wheel 130 is detected using a predetermined threshold, in order to prevent lane follow-up control performed by the external environment recognizer 202 from interfering with the steering operation of the driver, and outputs the rate to the subtractor 212.

The vehicle yaw rate calculator 222 calculates a yaw rate model value γ_clc using the following equations for calculating the vehicle yaw rate. More specifically, the yaw rate model value γ_clc (i.e., γ in Eqs. (5) and (6)) is calculated by substituting the vehicle velocity V and the steering wheel angle θh into Eqs. (5) and (6) below and solving Eqs. (5) and (6) simultaneously. In Eqs. (5) and (6), Kf represents cornering power (front) and Kr represents cornering power (rear). In eq. (3), the target cornering powers Kftgt and Krtgt, which are different from the cornering powers Kf and Kr in Eqs. (5) and (6), are used to make the target yaw rate γ_tgt greater than the yaw rate model value γ_clc to enhance the turning performance. The yaw rate model value γ_clc is output to the yaw rate F/B calculator 224. In addition, the yaw rate model value γ_clc is input to the subtractor 213.

$$2K_f \frac{\theta h}{N} = mV\frac{d}{dt}\beta + 2(K_f + K_r)\beta + \left\{mV + \frac{2}{V}(l_f K_f - l_r K_r)\right\}\gamma \quad (5)$$

$$2l_f K_f \frac{\theta h}{N} = 2(l_f K_f - l_r K_r)\beta + I\frac{d}{dt}\gamma + \frac{2}{V}(l_f^2 K_f + l_r^2 K_r)\gamma \quad (6)$$

Meanwhile, the subtractor 213 receives the actual yaw rate γ (hereinafter referred to as an actual yaw rate γ_sens) of the vehicle 1000 measured by the yaw rate sensor 142. The subtractor 213 subtracts the yaw rate model value γ_clc from the actual yaw rate γ_sens to obtain a difference γ_diff between the actual yaw rate γ_sens and the yaw rate model value γ_clc. The difference γ_diff is input to the weighting gain calculator 226.

The weighting gain calculator 226 calculates a weighting gain based on the difference γ_diff between the actual yaw rate γ_sens and the yaw rate model value γ_clc.

The yaw rate F/B calculator 224 receives the yaw rate model value γ_clc, the actual yaw rate γ_sens, and the weighting gain a. The yaw rate F/B calculator 224 weights both the yaw rate model value γ_clc and the actual yaw rate γ_sens using the weighting gain a, and calculates a feedback yaw rate γ_F/B based on Eq. (7) below. The calculated feedback yaw rate γ_F/B is output to the subtractor 212.

$$\gamma\_F/B = a \times \gamma\_clc + (1-a) \times \gamma\_sens \quad (7)$$

Figure 8:
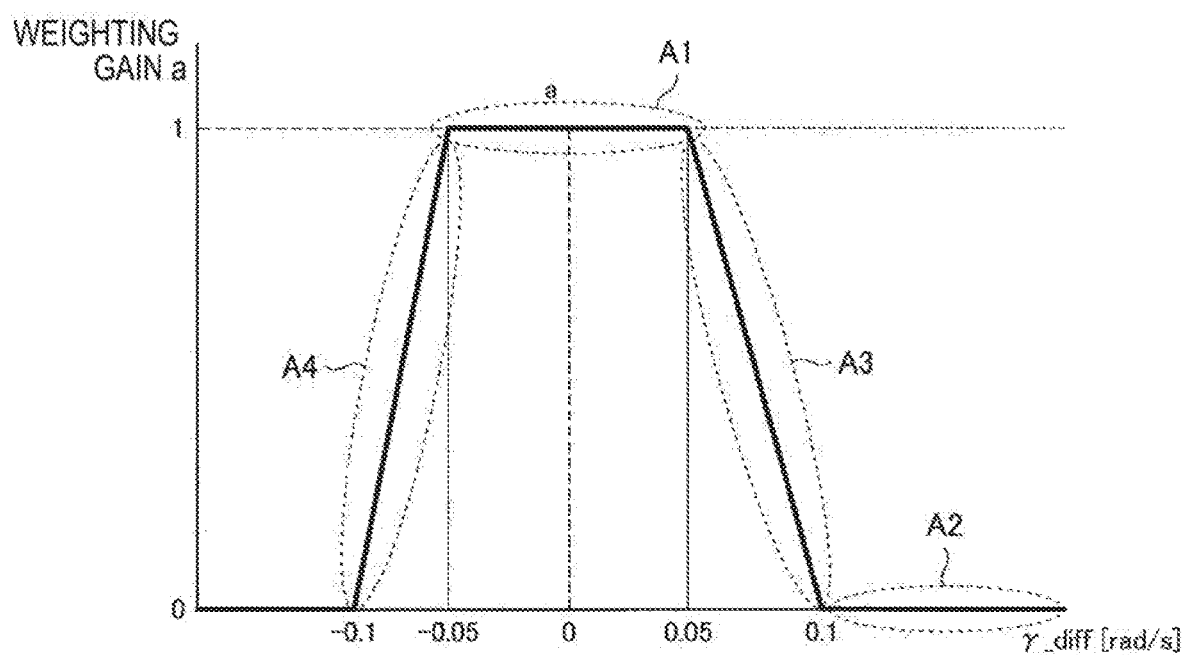

FIG. 8 is a schematic diagram illustrating a gain map used when the weighting gain calculator 226 calculates the weighting gain a. As illustrated in FIG. 8, the value of the weighting gain a varies between 0 and 1 in accordance with the reliability of the vehicle model. The difference (or deviation) γ_diff between the yaw rate model value γ_clc and the actual yaw rate γ_sens is used as an indicator of the reliability of the vehicle model. As illustrated in FIG. 8, the gain map is set such that the value of the weighting gain a increases as the absolute value of the difference γ_diff becomes smaller. The weighting gain calculator 226 performs a mapping process of FIG. 8 on the difference γ_diff to calculate the weighting gain a in accordance with the reliability of the vehicle model.

In FIG. 8, the weighting gain a is a value from 0 to 1 (0≤a<1). In the case of −0.05 [rad/s]≤γ_diff≤0.05 [rad/s], the weighting gain a is 1 (a=1).

In addition, in the case of 0.05<γ_diff, or γ_diff<−0.05, the weighting gain a is 0 (a=0).

In addition, in the case of 0.05 [rad/s]<γ_diff≤0.1 [rad/s], the weighting gain a is calculated using the following equation.

$$a=-20\times\gamma\_diff+2$$

In addition, in the case of −0.1 [rad/s]≤γ_diff<−0.05 [rad/s], the weighting gain a is calculated using the following equation.

$$a=20\times\gamma\_diff+2$$

A region A1 in the gain map illustrated in FIG. 8, which is a region where the difference γ_diff approaches 0, is a region where the S/N ratio of the actual yaw rate γ_sens is low, or a region where tire characteristics exhibit linearity (e.g., when the road surface is dry). Therefore, in the region A1, the yaw rate model value γ_clc calculated by the vehicle yaw rate calculator 222 has a high degree of reliability. Accordingly, the value of the weighting gain a is determined to be 1, and the feedback yaw rate γ_F/B is calculated using Eq. (7) with a 100% distribution of the yaw rate model value γ_clc. This eliminates an effect of noise of the yaw rate sensor 142 contained in the actual yaw rate γ_sens, and is thus able to prevent any sensor noise from affecting the feedback yaw rate γ_F/B. This contributes to preventing a vibration of the vehicle 1000, leading to improved ride comfort.

Here, the difference between the actual yaw rate γ and the yaw rate model value γ_clc calculated from the vehicle model is caused by, for example, dynamic characteristics of the tires. The aforementioned two-dimensional two-wheel model assumes a region where the relationship (i.e., the cornering characteristics of the tires) between the lateral acceleration and slip angles of the tires exhibits linearity, and in this linear region, the actual yaw rate γ and the yaw rate model value γ_clc substantially agree with each other. The region where the lateral acceleration exhibit linearity with respect to slip angles (region where a steering wheel operation speed is relatively low) is affected by noise of the yaw rate sensor 142. Accordingly, the yaw rate model value γ_clc is used in this region.

Meanwhile, in the region where the cornering characteristics of the tires exhibit nonlinearity, the yaw rate and the lateral acceleration of the actual vehicle vary nonlinearly with the steering angle or the slip angle, and a significant difference occurs between the yaw rate measured on the actual vehicle and the yaw rate of the two-dimensional two-wheel model. In such a transient nonlinear region, noise does not occur on account of the sensor characteristics of the yaw rate sensor 142, and the actual yaw rate γ can therefore be used. Such a nonlinear region corresponds to, for example, a time at which the steering wheel is turned back. A case where the actual yaw rate γ exceeds the yaw rate model value γ_clc corresponds to the nonlinear region, and in this case, no sensor noise produces an effect, and the actual yaw rate γ can therefore be used to allow control based on the true value. Note that, while use of a model that allows for nonlinearity of the tires complicates the control based on the yaw rate, the reliability of the yaw rate model value γ_clc can be easily estimated based on the difference γ_diff, and the actual yaw rate γ can be used with a greater distribution in the nonlinear region in the present implementation. Moreover, in a region where the dynamic characteristics of the tires can produce no or limited influence, only the yaw rate model value γ_clc may be used.

Further, a region A2 in the gain map illustrated in FIG. 8, which is a region where the difference γ_diff has a large value, corresponds to, for example, a time when the vehicle is traveling on a wet road surface, a time when the vehicle is traveling on a snow-covered road, or a time when the vehicle is making a sharp turn, and is a marginal region in which the tires are sliding. In this region, the yaw rate model value γ_clc calculated by the vehicle yaw rate calculator 222 has a low degree of reliability, and the difference γ_diff has a greater value. Accordingly, the value of the weighting gain a is determined to be 0, and the feedback yaw rate γ_F/B is calculated using Eq. (7) with a 100% distribution of the actual yaw rate γ_sens. This contributes to ensuring sufficient precision of the feedback based on the actual yaw rate γ_sens, allowing feedback control of the yaw rate reflecting the behavior of the actual vehicle. A turn of the vehicle 1000 can thus be optimally controlled based on the actual yaw rate γ_sens. Moreover, in the region in which the tires are sliding, noise in a signal obtained by the yaw rate sensor 142 would not cause a vibration of the vehicle 1000 that can be perceived by the driver, and would not cause a significant reduction in ride comfort. The low μ region A2 illustrated in FIG. 8, for which the value of the weighting gain a is determined to be 0, may be set based on design requirements, or may be experimentally determined based on steering stability performance, ride comfort, and so on when the vehicle 1000 actually travels on a low μ road surface.

Furthermore, in a region A3 in the gain map illustrated in FIG. 8, which is a transitional region (a nonlinear region) from the linear region to the marginal region, the distributions of the yaw rate model value γ_clc and the actual yaw rate γ_sens (i.e., the value of the weighting gain a) are linearly varied while taking into account the tire characteristics of the actual vehicle 1000 as necessary. In the transitional region from the region A1 (i.e., a high μ region) to the region A2 (i.e., a low μ region), or from the region A2 (i.e., the low μ region) to the region A1 (i.e., the high μ region), the weighting gain a is calculated using linear interpolation to avoid a torque change and a yaw rate change caused by an abrupt change in the weighting gain a.

Furthermore, a region A4 in the gain map illustrated in FIG. 8 corresponds to a case where the actual yaw rate γ_sens is greater than the yaw rate model value γ_clc. In the case where an incorrect parameter is input to the vehicle yaw rate calculator 222, and the yaw rate model value γ_clc is calculated incorrectly, for example, the actual yaw rate γ_sens can be used based on a map of the region A4 to perform control. Note that the range of the weighting gain a is not limited to the range of 0 to 1, and that any range of the weighting gain a that allows vehicle control may be adopted in other implementations of the present invention without departing from the scope of the present invention.

The subtractor 213 subtracts the feedback yaw rate γ_F/B from the target yaw rate γ_tgt, which is an input from the control target yaw rate calculator 210, to obtain a difference Δγ between the target yaw rate γ_tgt and the feedback yaw rate γ_F/B. That is, the difference Δγ is calculated from Eq. (8) below.

$$\Delta\gamma=\gamma\_Tgt-\gamma\_F/B \qquad (8)$$

The difference Δγ is input to the vehicle additional yaw moment calculator 214 as a yaw rate correction amount.

The vehicle additional yaw moment calculator 214 calculates the vehicle additional yaw moment Mg based on the input difference Δγ so that the difference Δγ will become 0, that is, so that the target yaw rate γ_tgt will agree with the feedback yaw rate γ_F/B. More specifically, the vehicle additional yaw moment Mg is calculated from Eq. (9) below. More specifically, the vehicle additional yaw moment Mg is calculated from Eq. (9) below. A turning moment based on the vehicle additional yaw moment Mg is additionally applied to the vehicle 1000.

$$Mg = \frac{d}{dt}\Delta\gamma \times Iz + \Delta\gamma \times \{2(l_f^2 K_f + l_r^2 K_r)/V\} \qquad (9)$$

Figure 9:
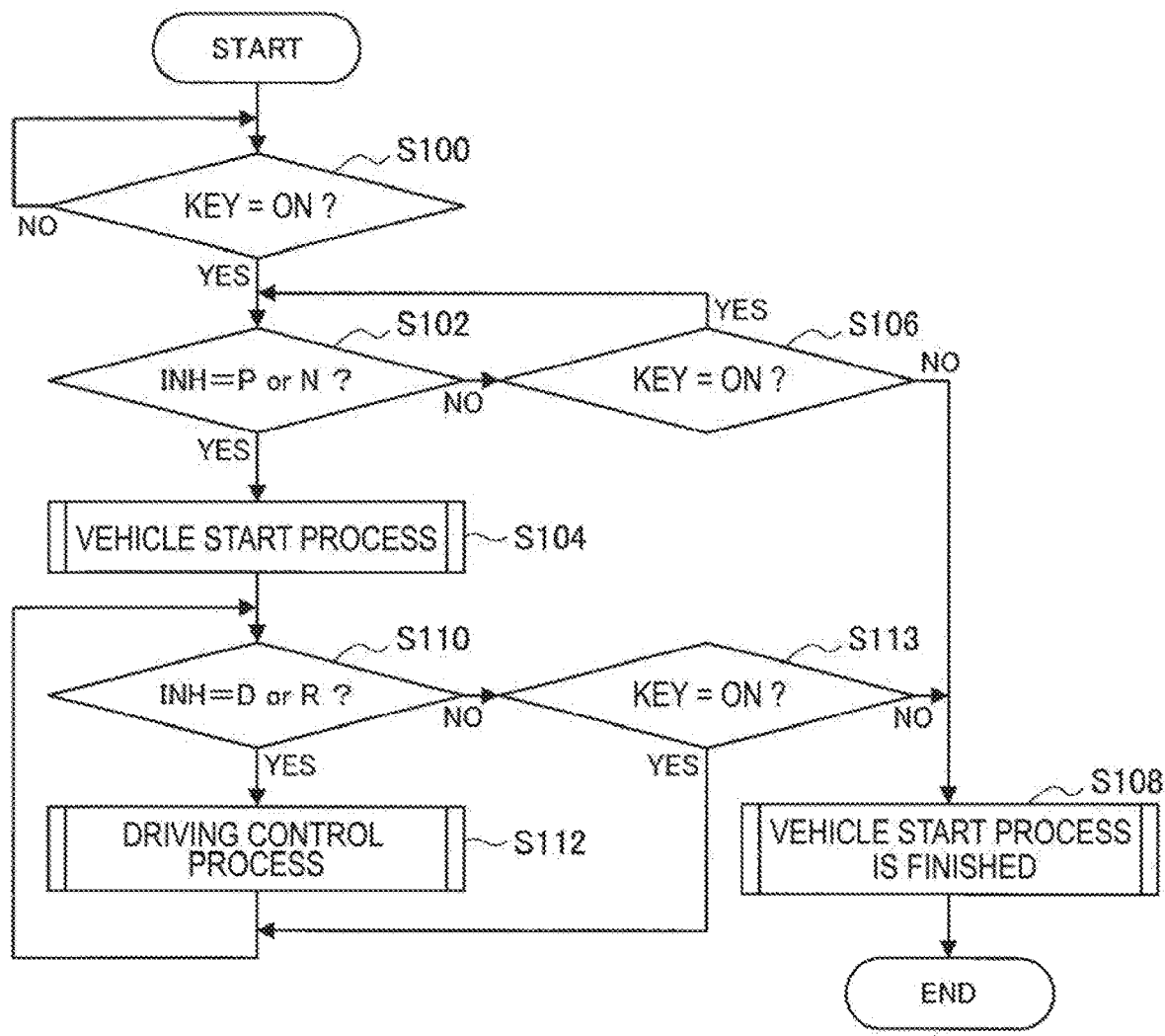
FIG. 9 is a flowchart illustrating overall processing according to the present implementation.

Next, overall processing performed by the control unit 200 according to the present implementation will now be described below. FIG. 9 is a flowchart illustrating overall processing according to the present implementation. First, at step S100, it is determined whether an ignition key (i.e., an ignition SW) is in an ON position. If it is determined that the ignition key is in the ON position, control proceeds to step S102, whereas control waits at step S100 while the ignition key is not in the ON position.

At step S102, it is determined whether the inhibitor position sensor (INH) 144 indicates a P (parking) or N (neutral) position. If it is determined at step S102 that the inhibitor position sensor (INH) 144 indicates the P (parking) or N (neutral) position, control proceeds to step S104. Meanwhile, if it is determined at step S102 that the inhibitor position sensor (INH) 144 does not indicate the P (parking) or N (neutral) position, control proceeds to step S106. At step S106, it is determined whether the ignition key is in the ON position, and if it is determined that the ignition key is in the ON position, control returns to step S102. If it is determined at step S106 that the ignition key is in an OFF position, control proceeds to step S108, and a process of starting the vehicle 1000 is finished, and control returns to step S100.

At step S104, the process of starting the vehicle 1000 is performed, and at next step S110, it is determined whether the inhibitor position sensor (INH) 144 indicates a D (drive) or R (reverse) position. Then, if it is determined that the inhibitor position sensor (INH) 144 indicates the D (drive) or R (reverse) position, control proceeds to step S112, and a driving control process is started. Meanwhile, if it is determined at step S110 that the inhibitor position sensor (INH) 144 does not indicate the D (drive) or R (reverse) position, control proceeds to step S113. At step S113, it is determined whether the ignition key is in the ON position, and if it is determined that the ignition key is in the ON position, control returns to step S110. If it is determined at step S113 that the ignition key is in the OFF position, control proceeds to step S108, and the process of starting the vehicle 1000 is finished.

In the present implementation describe above, if the state of charge of the high-voltage battery 1040 lowers, control is switched from the turn control to be performed by left-right driving force distribution of the motors 108, 110, 112, and 114 to steering wheel control of the electric power steering motor 1060, which increases the torque of the electric power steering motor 1060. Furthermore, control is switched from the turn control to be performed by left-right driving force distribution to steering wheel control of the electric power steering motor 1060 according to a slip angle of the vehicle 1000.

In addition, when the vehicle slips while the turn control to be performed by left-right driving force distribution of the motors 108, 110, 112, and 114 is being carried out, the behavior of the vehicle 1000 become unstable. Thus, in the present implementation, determination of a slip is made while the turn control to be performed by left-right driving force distribution of the motors 108, 110, 112, and 114 is being carried out, and when a slip is determined to have occurred, the motor torque of the electric power steering motor 1060 is controlled to achieve a desired turn, and behaviors of the vehicle are stabilized.

Figure 10:
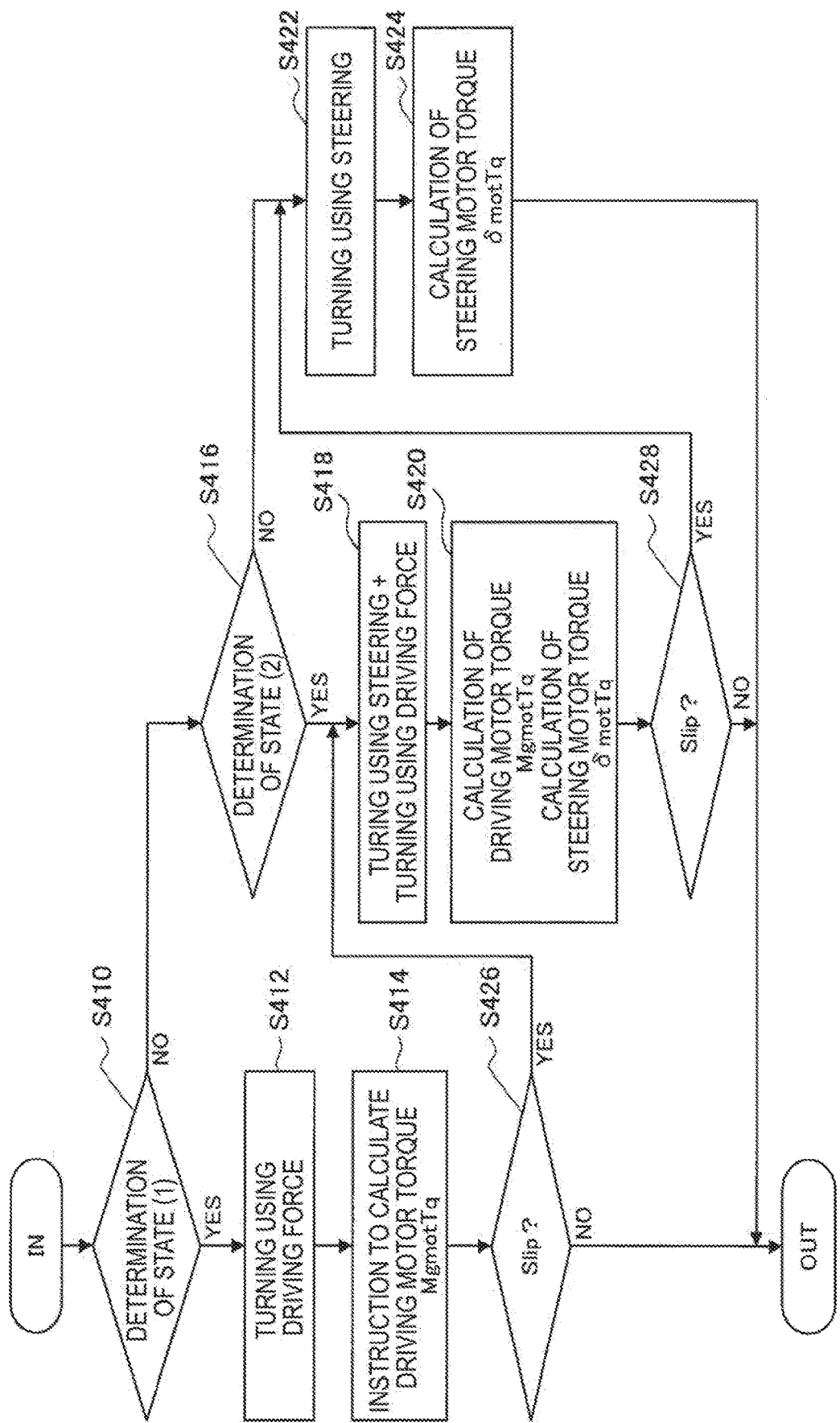
FIG. 10 is a flowchart illustrating an overview of turn control to be performed by left-right driving force distribution and steering wheel control according to the present implementation.

FIG. 10 is a flowchart illustrating an overview of turn control to be performed by left-right driving force distribution and steering wheel control according to the present implementation. First, a state of the vehicle is determined at step S410. Here, the state of the vehicle is determined based on a slip angle and the SOC, and if the slip angle is less than a predetermined value and the SOC is equal to or higher than a predetermined value, control proceeds to step S412. Performing turning driving control using left-right driving force control is determined at step S412. In the next step S414, a turning driving force MgmotTq based on the left-right driving force control is calculated.

Further, if the condition of step S410 is not satisfied, control proceeds to step S416. In step S416, a state of the vehicle is determined based on a slip angle and the SOC, and if the slip angle is equal to or greater than the predetermined value and the SOC is equal to or greater than the predetermined value, control proceeds to step S418. In step S418, performing the turning driving control using the left-right driving force control and turning using steering by the electric power steering motor 1060 is decided. In the next step S420, the turning driving force MgmotTq based on the left-right driving force control and steering motor torque δmotTq (steering assist torque) of the electric power steering motor 1060 are calculated.

In addition, if the condition of step S416 is not satisfied, control proceeds to step S422. In step S422, performing turning using steering by the electronic power steering motor is decided. In the next step S424, the steering motor torque δmotTq of the electric power steering motor 1060 is calculated.

Further, control proceeds to step S426 after step S414 to determine whether a slip has occurred in the vehicle 1000, and if a slip is determined to have occurred, control proceeds to step S418. On the other hand, if no slip is determined to have occurred, the process ends.

In addition, control proceeds to step S428 after step S420 to determine whether a slip has occurred in the vehicle 1000, and if a slip is determined to have occurred, control proceeds to step S422. On the other hand, if no slip is determined to have occurred, the process ends.

As described above, a slip is likely to occur if only the left-right driving force control is applied when a road-surface friction factor μ is low with regard to control of the present implementation. Thus, when detection of a slip is also used, and a slip is detected, a turning mechanism is set to transition from (left-right driving force control)→(left-right driving force control+steering driving force control)→(steering driving force control), and thereby stability of the vehicle is controlled.

Figure 11:
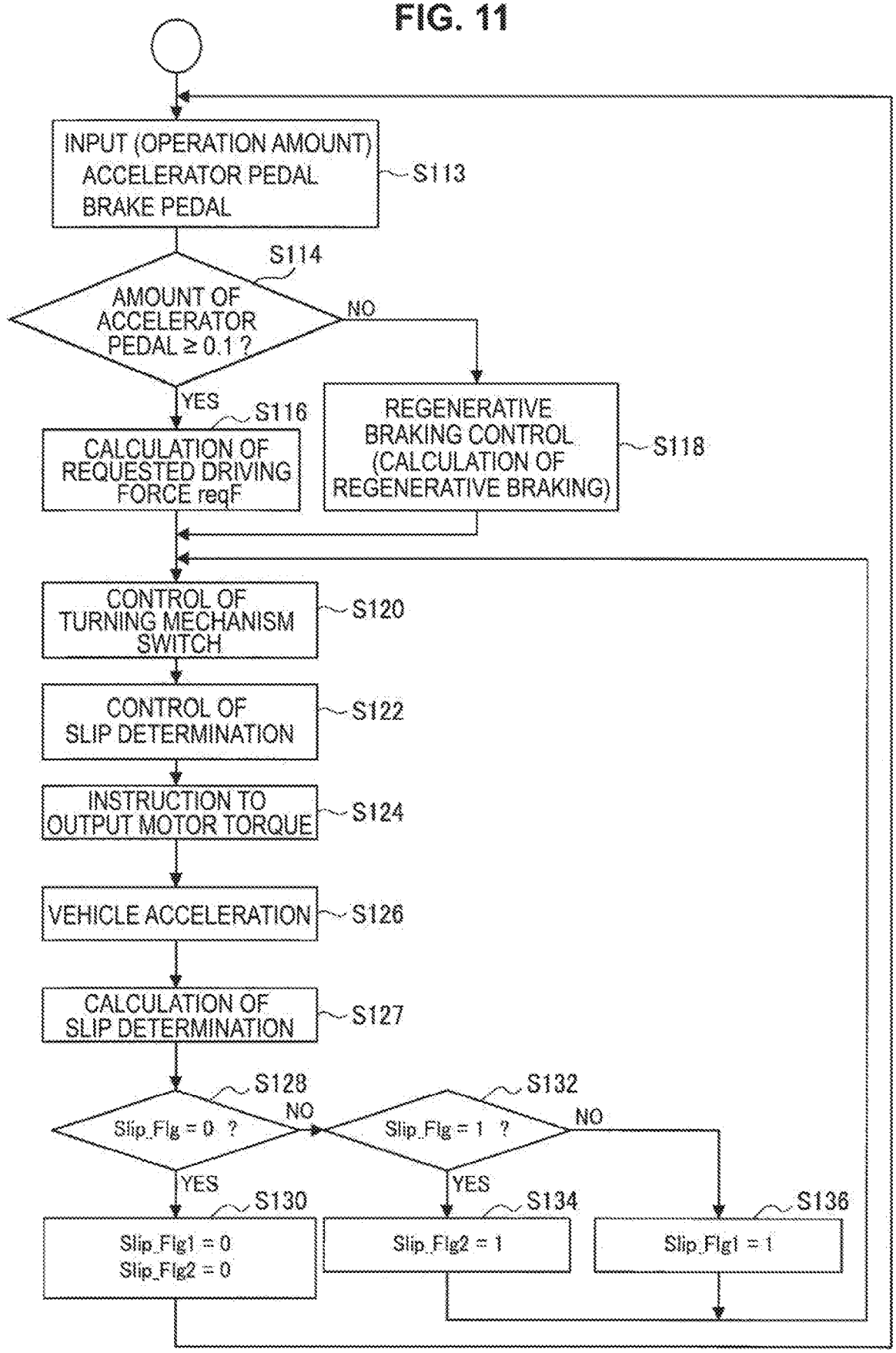
FIG. 11 is a flowchart illustrating a process at step S112 of FIG. 9 in detail.

FIG. 11 is a flowchart illustrating the process at step S112 of FIG. 9. First, amounts of operations of the accelerator pedal and the brake pedal are acquired as input values at step S113. At next step S114, it is determined whether the amount of the operation of the accelerator pedal is 0.1 or more, and if it is determined that the amount of the operation of the accelerator pedal is 0.1 or more, control proceeds to step S116. At step S116, the requested driving force reqF is calculated based on the amount of the operation of the accelerator pedal. Note that the calculation of the requested driving force reqF may be performed based on, for example, a map that defines the relationship between the accelerator opening degree and the requested driving force reqF. Meanwhile, if it is determined that the amount of the operation of the accelerator pedal is less than 0.1, control proceeds to step S118, and regenerative braking control is performed on each of the motors 108, 110, 112, and 114.

After steps S116 and S118, control proceeds to step S120. At step S120, control of the turning mechanism switch is performed using the method illustrated in FIG. 10. At the next step S122, control of slip determination is performed. At the next step S124, a motor torque instruction value is calculated to instruct a torque of each of the motors 108, 110, 112, and 114. At next step S126, an acceleration of the vehicle 1000 is measured by the longitudinal acceleration sensor 132 and the lateral acceleration sensor 134.

Control proceeds to step S127 after step S126 to determine and calculate a slip. At the next step S128, whether Slip_Flg=0 is determined, and if Slip_Flg=0 is satisfied, control proceeds to step S130 to set Slip_Flg1=0 and Slip_Flg2=0.

Meanwhile, if Slip_Flg=0 is not satisfied in step S128, control proceeds to step S132 to determine whether Slip_Flg1=1. If Slip_Flg1=1, control proceeds to step S134 to set Slip_Flg2=1. If Slip_Flg1=1 is not satisfied in step S132, control proceeds to step S136 to set Slip_Flg1=1. After steps S130, S134, and S136, control returns to step S120.

Figure 12:
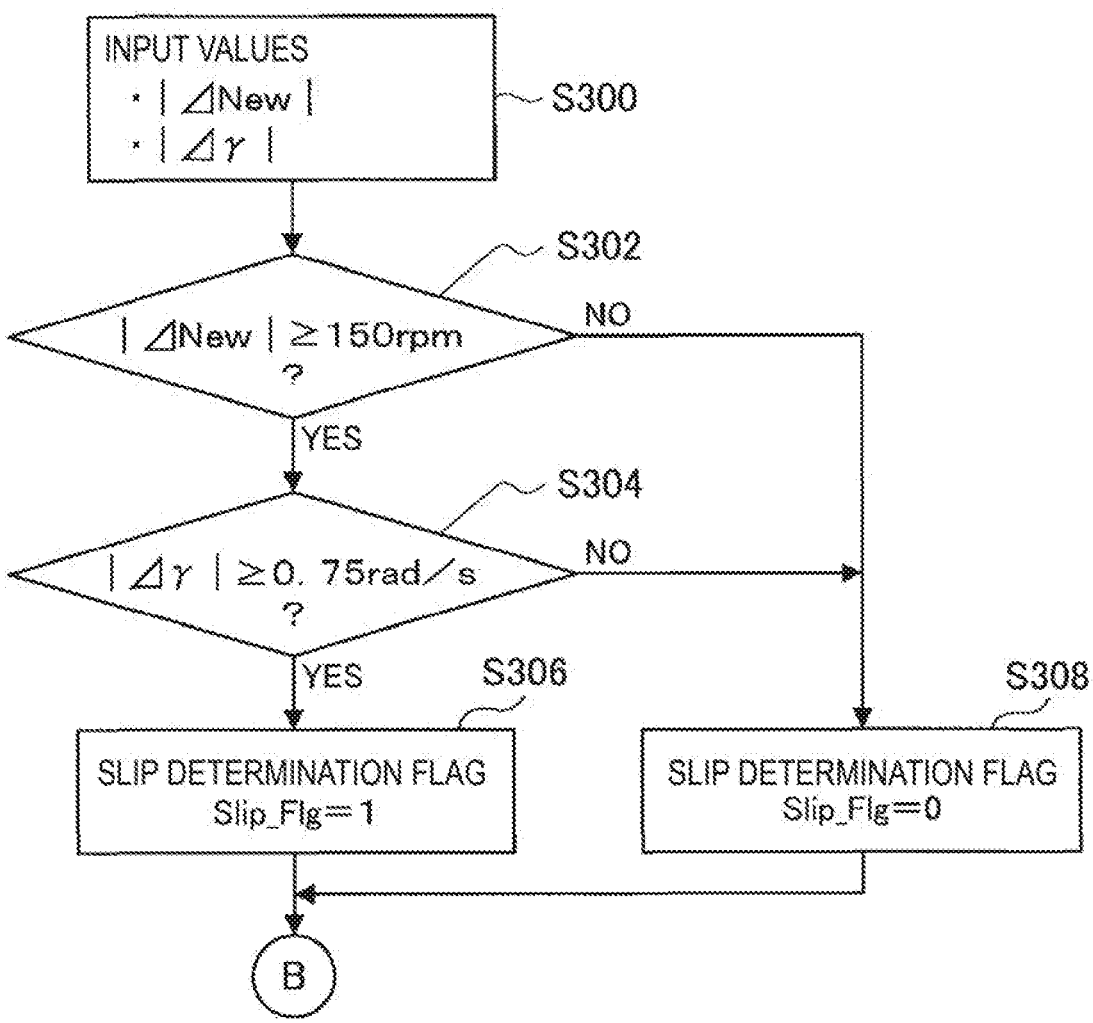
FIG. 12 is a flowchart illustrating a process of slip determination calculation at step S127 of FIG. 11 in detail.

FIG. 12 is a flowchart illustrating a process of calculating slip determination at step S127 of FIG. 11 in detail. This process is performed by the slip determiner 245. First, |ΔNew| and |Δγ| are acquired as input values in step S300. Here, ΔNew is the absolute value of the difference between the theoretical left-right difference rotation value (absolute value) |ΔNew_clc| and the actual left-right difference rotation value (absolute value) |ΔNew_real|, which is expressed as |ΔNew|=|ΔNew_clc−ΔNew_real|. In addition, |Δγ|=|γtgt−γF/B|.

It is determined whether |ΔNew|≥150 rpm at the next step S302, and if |ΔNew| 150 rpm is satisfied, control proceeds to step S304 to determine whether |Δγ|≥0.75 rad/s is satisfied. If |Δγ|≥0.75 rad/s is satisfied in step S304, control proceeds to step S306 to set a slip determination flag Slip_Flg=1. Meanwhile, if |ΔNew|<150 rpm is satisfied at step S302 or |Δγ|<0.75 rad/s is satisfied at step S304, control proceeds to step S308 to set the slip determination flag Slip_Flg=0.

At steps S130 to S136 of FIG. 11, the states of Slip_Flg1 and Slip_Flg2 are set according to the state of Slip_Flg calculated in the process of FIG. 12. If Slip_Flg is 0, Slip_Flg1 and Slip_Flg2 are all set to 0. However, if Slip_Flg is 1, Slip_Flg1 is set to 1 in the next control period, and Slip_Flg2 is set to 1 in the subsequent next control period.

Figure 13:
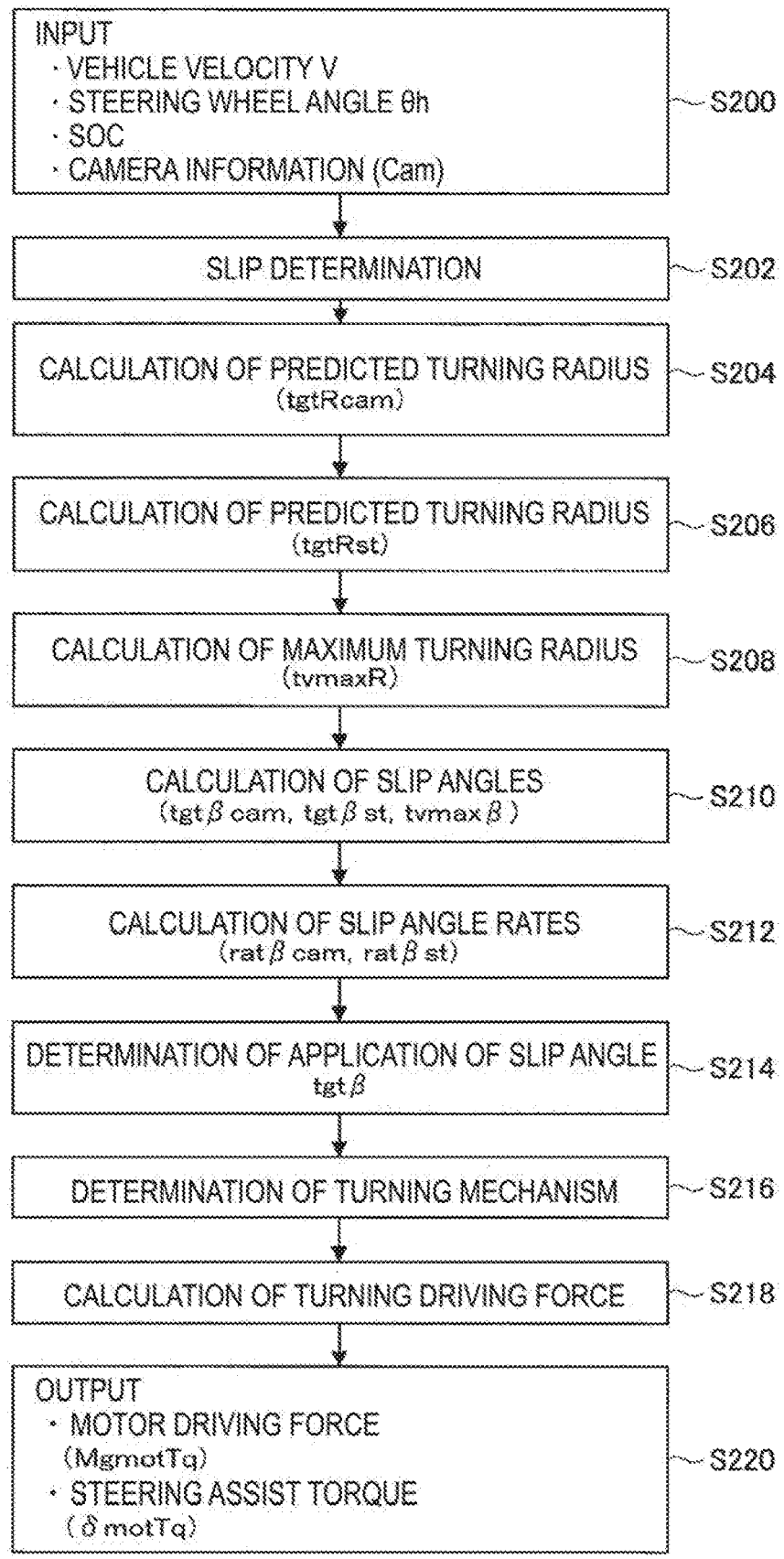
FIG. 13 is a flowchart illustrating an overview of a process at step S120 of FIG. 11.

Next, an important process of the process of FIG. 11 will be described in detail. FIG. 13 is a flowchart illustrating an overview of a process at step S120 of FIG. 11. First, a vehicle velocity V, a steering wheel angle θh, SOC, and camera information (Cam) are acquired as input values at step S200. At the next step S202, a slip is determined based on states of the flags Slip_Flg1 and Slip_Flg2. At the next step S204, the predicted turning radius calculator 216 calculates a predicted turning radius tgtRcam from an image of the stereo camera assembly. At the next step S206, the predicted turning radius calculator 228 calculates a predicted turning radius tgtRst obtained from a steering wheel operation of the driver. Note that the method for calculating the predicted turning radius tgtRcam will be described below.

At the next step S208, the maximum turning radius calculator 236 calculates a maximum turning radius tvmaxR. The maximum turning radius calculator 236 calculates the maximum turning radius tvmaxR from a driving force turn critical radius map based on a maximum motor torque calculated by the maximum motor torque driving force calculator 234 using the vehicle velocity V or the number of motor rotations. Note that the driving force turn critical radius map will be described below. At the next step S210, a slip angle is calculated. Here, the predicted slip angle calculator 218 calculates a slip angle tgtβcam from the predicted turning radius tgtRcam by converting to a slip angle value of the center of gravity of the vehicle. Furthermore, the predicted slip angle calculator 230 calculates a slip angle tgtβst from the predicted turning radius tgtRst. Moreover, the turnable slip angle calculator 238 calculates a slip angle tvmaxβ from the maximum turning radius tvmaxR.

At the next step S212, the slip angle change rate calculator 220 calculates a slip angle rate ratβcam by dividing the slip angle tgtβcam by the slip angle tvmaxβ. In addition, the slip angle change rate calculator 232 calculates a slip angle rate ratβst by dividing the slip angle tgtβst by the slip angle tvmaxβ.

At the next step S214, slip angle application is determined. Here, the slip angle change rate determiner 240 compares a slip angle rate tvβcam and the slip angle rate tvβst, and then selects a higher slip angle rate as a control value.

At the next step S216, the turning mechanism determination calculator 242 makes a determination of a turning mechanism. The turning mechanism determination calculator 242 makes a determination of a turning mechanism based on the SOC and a slip angle rate. At the next step S218, the driving force calculator 244 calculates a turning driving force. As a result of this calculation, at step S220, the turning driving force MgmotTq of the motors 108, 110, 112, and 114, and a steering assist torque δmotTq of the electric power steering motor 1060 are output. The turning driving force MgmotTq to be used as a left-right wheel driving torque is output to the motor-required torque instructing module 248, and then the motors 108, 110, 112, and 114 are driven based on the turning driving force MgmotTq. Furthermore, the steering assist torque δmotTq is output to the steering torque instructing module 246, and then the electric power steering motor 1060 is driven based on the steering assist torque δmotTq. In this manner, the turning mechanism determination calculator 242 and the driving force calculator 244 function as adjusters which adjust the steering assist torque δmotTq and the turning driving force MgmotTq to be used as a left-right wheel driving torque, in order to apply a vehicle additional yaw moment Mg.

Figure 14:
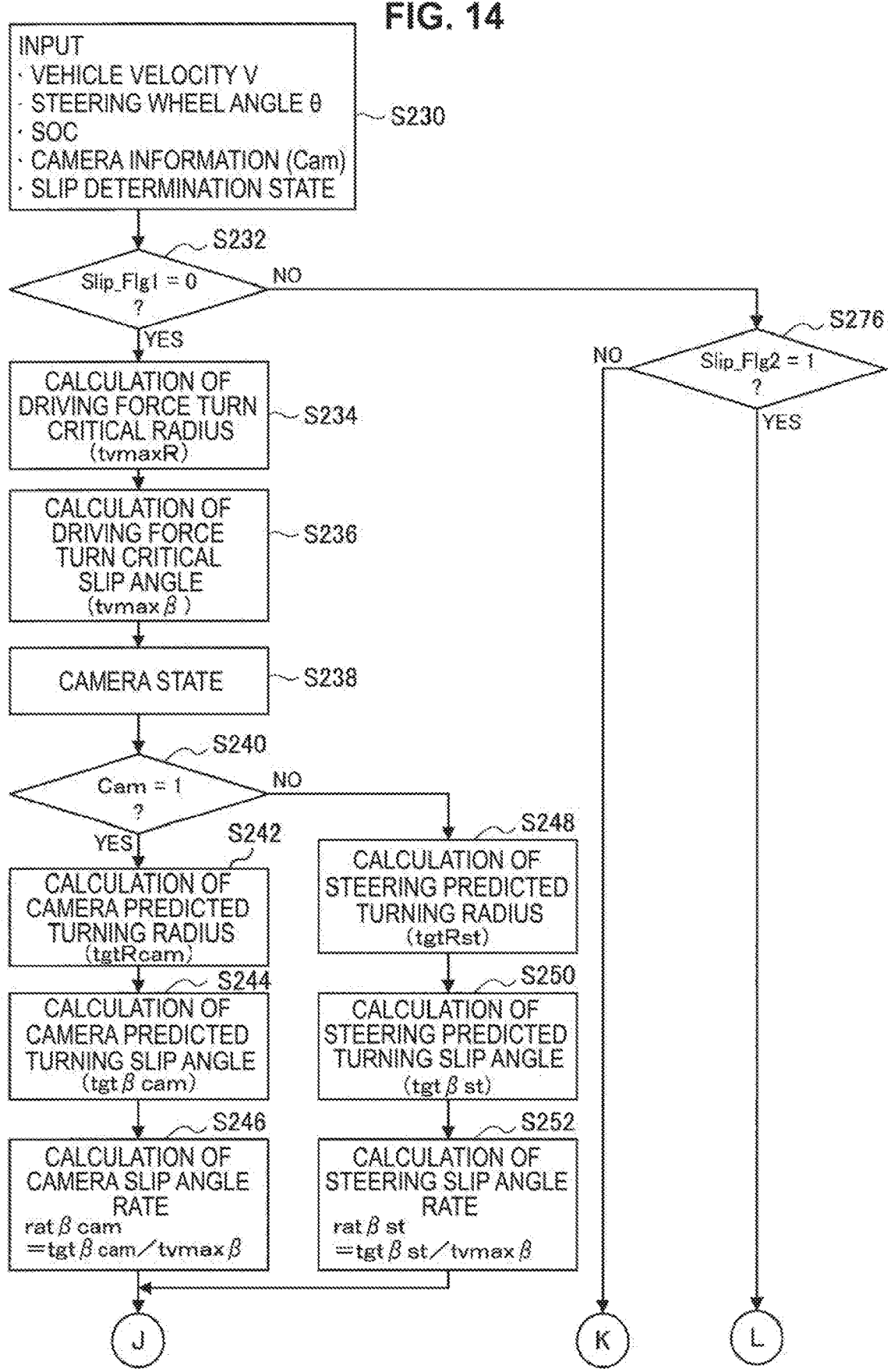
FIG. 14 is a flowchart illustrating a process at step S120 of FIG. 11 in more detail.
Figure 15:
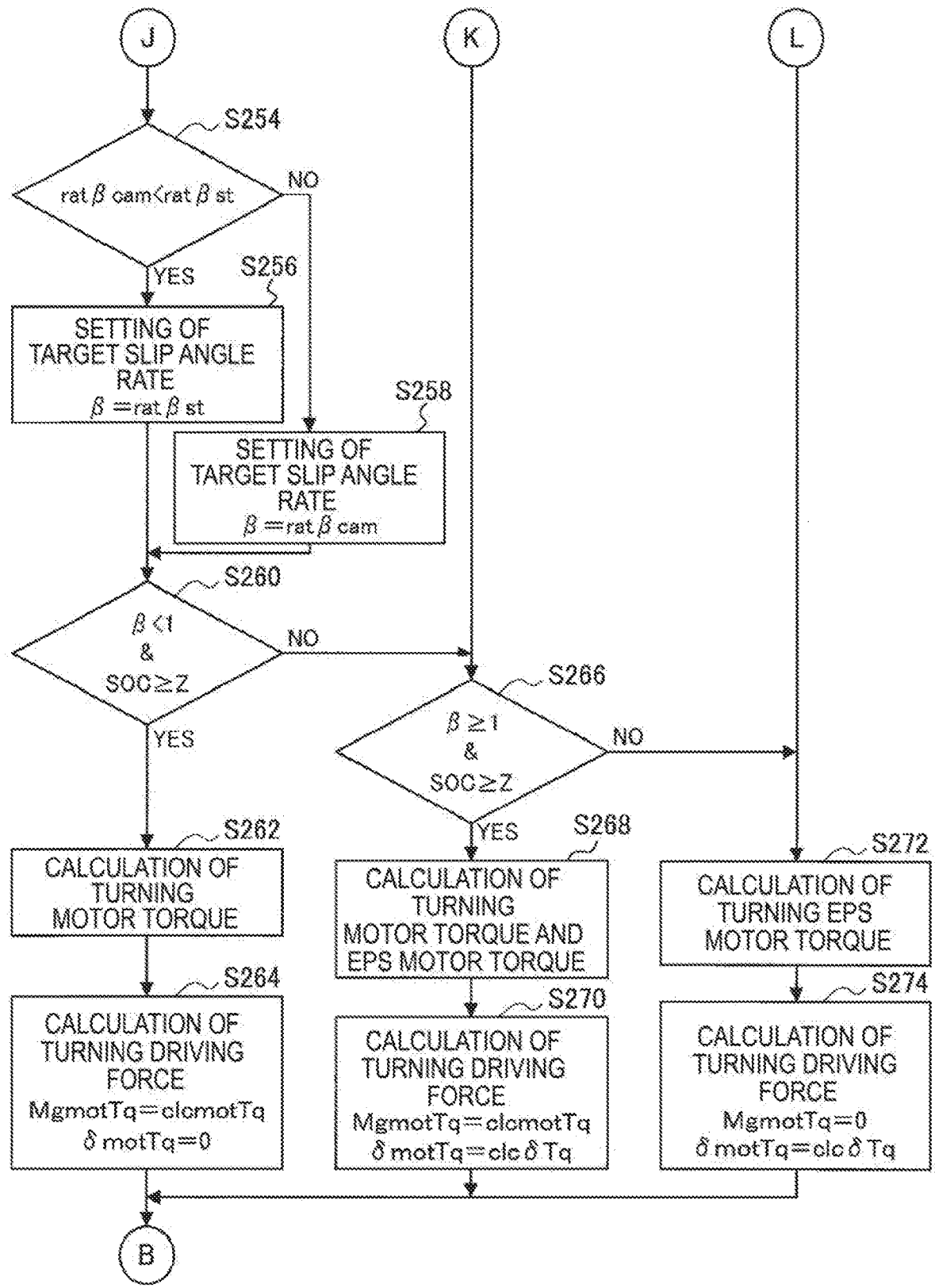
FIG. 15 is a flowchart illustrating a process at step S122 of FIG. 11 in more detail.

FIG. 14 is a flowchart illustrating a process at step S120 of FIG. 11 in more detail. FIG. 15 is also a flowchart illustrating a process at step S122 of FIG. 11 in more detail. The process of FIG. 15 is performed subsequently to the process of FIG. 14. First, at step S230 of FIG. 14, the vehicle velocity V, the steering wheel angle θh, the SOC, the cameral information (Cam), and a slip determination state are acquired as input values. At the next step S232, whether Slip_Flg1=0 is determined, and if Slip_Flg1=0 is satisfied, control proceeds to step S234. At step S234, the maximum turning radius calculator 236 calculates the maximum turning radius tvmaxR. At the next step S236, the turnable slip angle calculator 238 calculates the slip angle tvmaxβ.

At the next step S238, the state of the stereo camera assembly of the external environment recognizer 202 (camera information (Cam)) is acquired. At the next step S240, whether Cam=1 is determined based on the camera state acquired at step S238, and if Cam=1 is satisfied, control proceeds to step S242. Here, the state of the camera is regarded as being favorable if Cam=1 is satisfied, and regarded as being unfavorable if Cam=0 is satisfied.

At step S242, the predicted turning radius calculator 216 calculates the predicted turning radius tgtRcam, and at the next step S244, the predicted slip angle calculator 218 calculates the slip angle tgtβcam. At the next step S246, the slip angle change rate calculator 220 calculates the slip angle rate ratβcam.

Meanwhile, if Cam=0 is satisfied at step S240, control proceeds to step S248. At step S248, the predicted turning radius calculator 228 calculates the predicted turning radius tgtRst, and at the next step S250, the predicted slip angle calculator 230 calculates the slip angle tgtβst. At the next step S252, the slip angle change rate calculator 232 calculates the slip angle rate ratβst.

Control proceeds to step S254 of FIG. 15 after steps S246 and S252. At step S254, the slip angle change rate determiner 240 compares the slip angle rate ratβcam and the slip angle rate ratβst, and if ratβcam<ratβst is satisfied, control proceeds to step S256. At step S256, the slip angle change rate determiner 240 sets a target slip angle change rate β to the slip angle change rate ratβst.

On the other hand, if ratβcam≥ratβst is satisfied at step S254, control proceeds to step S258. At step S258, the slip angle change rate determiner 240 sets a target slip angle change rate β to the slip angle change rate ratβcam. Control proceeds to step S260 after steps S256 and S258.

At step S260, the turning mechanism determination calculator 242 determines whether β<1 and SOC≥Z are satisfied based on the target slip angle rates 13 set in steps S256 and S258 and the value of the SOC, and if β<1 and SOC≥Z are satisfied, control proceeds to step S262. At step S262, the turning mechanism determination calculator 242 decides to calculate a turning motor torque as a turning driving force. At the next step S264, the driving force calculator 244 calculates a turning driving force. Here, based on the result of step S262, MgmotTq=clcmotTq and δmotTq=0 are set. Specifically, the driving force calculator 244 calculates clcmotTq from the respective Eqs. below.

$$tgt\delta = \frac{(1 + AV^2)}{\left(1 - \frac{m}{2l} \times \frac{l_f}{l_y K_y} V^2\right)} \times \frac{l}{l_y} \times tgt\beta \tag{10}$$

$$tgt\gamma = \frac{1}{1 + AV^2} \times \frac{V}{l} \times tgt\delta \tag{11}$$

$$Mg = Iz \times \frac{d}{dt} tgt\gamma \tag{12}$$

$$D = Mg \times \frac{1}{TrdR} \tag{13}$$

$$clcMotTq = D \times TireR \times \frac{1}{GboxRatio} \tag{14}$$

If β<1 and SOC≥Z are not satisfied at step S260, control proceeds to step S266. At step S266, whether β≥1 and SOC≥Z are satisfied is determined, and if β≥1 and SOC≥Z are satisfied, control proceeds to step S268. At step S268, the turning mechanism determination calculator 242 decides to calculate a turning motor torque of the left-right driving force to be used as a turning driving force and a torque of the electric power steering motor 1060. At the next step S270, the driving force calculator 244 calculates a turning driving force. Here, based on the result of step S268, MgmotTq=clcmotTq and δmotTq=clcδTq are set. Specifically, the driving force calculator 244 calculates clcmotTq and clcδTq from the respective Eqs. below. In this case, clcmotTq serves as a maximum motor torque value maxMotTq, and clcδTq serves as a torque obtained by subtracting a yaw rate of a motor torque from a yaw rate necessary for a turn.

$$tgt\delta = \frac{(1 + AV^2)}{\left(1 - \frac{m}{2l} \times \frac{l_f}{l_y K_y} V^2\right)} \times \frac{l}{l_y} \times tgt\beta \tag{15}$$

$$tgt\gamma = \frac{1}{1 + AV^2} \times \frac{V}{l} \times tgt\delta \tag{16}$$

$$D\max = \max MotTq \times Gbox\_ratio \times \frac{1}{TireR} \tag{17}$$

$$\max Mg = \frac{D\max}{TrdR} \tag{18}, (19), (20)$$

$$\frac{d}{dt}\gamma_{Mg} = \frac{Mg}{Iz}$$

$$\gamma_{Mg} = \int \frac{d}{dt} \gamma_{Mg}$$

$$tgt\gamma = \gamma_{Mg} + \gamma_{\delta} \tag{21}$$

$$\gamma_{\delta} = tgt\gamma - \gamma_{Mg} \tag{22}$$

$$tgt\delta = (1 + AV^2) \times \frac{l}{V} \times \gamma_{\delta} \tag{23}$$

$$clc\delta Tq = \left[(T_{SA}fl + T_{SA}fr) \times l_{tp} + I_{t\delta} \times \frac{d}{dt}\left(\frac{d}{dt} tgt\delta\right)\right] \times \frac{1}{St\_Gboxratio} \tag{24}$$

$$clcMotTq = \max MotTq \tag{25}$$

If β≥1 and SOC≥Z are satisfied at step S266, control proceeds to step S272. At step S272, the turning mechanism determination calculator 242 decides to calculate a torque of the electric power steering motor 1060 to be used as a turning driving force. At the next step S274, the driving force calculator 244 calculates a turning driving force. Here, based on the result of step S272, MgmotTq=0 and δmotTq=clcδTq are set. Specifically, the driving force calculator 244 calculates clcMotTq and clcδTq from the respective Eqs. below. In this case, clcMotTq serves as a maximum motor torque value maxMotTq, and clcδTq serves as a torque obtained by subtracting a yaw rate from a motor torque from a yaw rate necessary for a turn.

$$tgt\delta = \frac{(1 + AV^2)}{\left(1 - \frac{m}{2l} \times \frac{l_f}{l_y K_y} V^2\right)} \times \frac{l}{l_y} \times tgt\beta \tag{26}$$

$$clc\delta Tq = \left[(T_{SA}fl + T_{SA}fr) \times l_{tp} + I_{t\delta} \times \frac{d}{dt}\left(\frac{d}{dt} tgt\delta\right)\right] \times \frac{1}{St\_Gboxratio} \tag{27}$$

Note that the variables, the constants, and the operator in Eqs. (10) to (27) are as follows.

tgtδ: a target steering wheel angle
tgtβ: a target vehicle slip angle
tgtγ: a target yaw rate
clcδTq: a turn steering torque
$T_{SA}$fl: a front-left self-aligning torque
$T_{SA}$fr: a front-right self-aligning torque
$l_{tp}$: the distance from the center of tire steering to an end of a tie rod
$l_{tb}$: inertia acting on rotation of a tire steering shaft
St_Gboxratio: a steering gear ratio
lz: vehicle yaw inertia
D: the difference between left and right driving forces in a turn
Dmax: the maximum difference between left and right driving forces in a turn
TireR: the radius of a tire
Gboxratio: a gear ratio of a motor and a gearbox
$γ_δ$: a yaw rate obtained from a steering wheel angle
$γ_{Mg}$: a yaw rate obtained from left-right driving force distribution
A: a stability factor Further, if Slip_Flg1=1 is satisfied at step S232, control proceeds to step S276. At step S276, whether Slip_Flg2=1 is satisfied is determined, and if Slip_Flg2=1 is satisfied, control proceeds to step S272 of FIG. 15. On the other hand, if Slip_Flg2=0 is satisfied at step S276, control proceeds to step S266 of FIG. 15.

The states of Slip_Flg1, Slip_Flg2 are decided according to a control period which starts after it is determined that a slip has occurred as described above. The process of step S274 is performed at the point at which the slip starts occurring after the processes of steps S232 and S276, and then the process of one of step S268 and step S272 is performed according to the determination of step S266. Note that the slip determiner 245 performs the determination of step S232 and S276.

As described above, steering assist is carried out due to the torque of the electric power steering motor 1060 if SOC<Z is satisfied according to the process of FIG. 15. Thus, it is possible to reliably eliminate a possibility of turn assist control, which is performed based on driving force control using the difference between left and right driving forces, not being realized, which can be caused by lowering of the amount of charge of the high-voltage battery 1040, while a turn is made using the difference between left and right driving forces from the motors 108, 110, 112, and 114.

In addition, according to the process of FIG. 15, when the slip angle change rate is high, driving force control to be performed by using the difference between left and right driving forces generated from the motors 108, 110, 112, and 114 is frequently performed, which affects behaviors of the vehicle and increases a possibility of drivability deteriorating. By switching control to steering assist control using the torque of the electric power steering motor 1060, however, behaviors of the vehicle can be stabilized. Accordingly, drivability can be remarkably improved. Note that, although the control mechanism is switched based on the result of the comparison between the SOC and the slip angle change rates and the threshold values in FIG. 15, the motor torque of the left-right driving forces and the torque of the electric power steering motor 1060 can be continuously changed based on the values of the SOC and the slip angle change rates. Furthermore, the control mechanism may be changed based on the difference Δγ between the control target yaw rate γ_tgt and the feedback yaw rate γ_F/B, or the difference γ_diff between the actual yaw rate γ_sens and the yaw rate model value γ_clc. In this case, a turn based only on left-right driving force distribution is performed in a high SOC state in which the differences are small, a turn based only on a steering wheel operation is performed in a low SOC state in which the differences are great, and a turn based on a steering wheel operation and left-right driving force distribution is performed when the differences are equal to or smaller than the set threshold value in an intermediate SOC state.

Furthermore, according to the process of FIG. 15, an amount of control over the vehicle 1000 can be quantitatively indicated by determining a turning mechanism based on the slip angle change rates (ratβcam and ratβst) calculated from the slip angles (tgtβcam and tgtβst) of the vehicle, rather than the turning radius R. Therefore, control precision can be significantly improved.

Moreover, if the slip angle change rate ratβcam obtained from image information of the stereo camera assembly and the slip angle change rate ratβst obtained from a steering wheel angle are compared to select a greater value between them, a condition for override, which occurs when the processing is carried out by one side of the stereo camera assembly and the steering wheel part, can be eliminated, and thus simplification of the control flow can be achieved.

When the turning driving force is calculated as described above, an instruction to output the torques of the motors is performed at step S124 of FIG. 11. Motor toque instruction values of the motors 108, 110, 112, and 114 at the time of a turn can be expressed using Eqs. (28) to (31) below. The motor-required torque instructing module 248 calculates the motor torque instruction values TqmotFl, TqmotFr, TqmotRl, and TqmotRr of the motors 108, 110, 112, and 114 based on Eqs. (28) to (31).

$$TqmotFl \text{ (the motor torque instruction value of the front-left wheel)} = reqTq/4 \quad (28)$$

$$TqmotFr \text{ (the motor torque instruction value of the front-right wheel)} = reqTq/4 \quad (29)$$

$$TqmotRl \text{ (the motor torque instruction value of the rear-left wheel)} = reqTq/4 - (\pm Tvmot) \quad (30)$$

$$TqmotRr \text{ (the motor torque instruction value of the rear-right wheel)} = reqTq/4 + (\pm Tvmot) \quad (31)$$

Here, the additional torque Tvmot corresponds to the turning driving force MgmotTq. A sign of the additional torque Tvmot is set according to a turn direction. Note that, although left-right driving force control is performed by applying the additional torque Tvmot to the rear-left wheel and the rear-right wheel here, the additional torque Tvmot may be applied on the front-left wheel and the front-right wheel, or to the four wheels.

In addition, the steering torque instructing module 246 outputs the steering assist torque δmotTq to as the torque of the electric power steering motor 1060.

Figure 16:
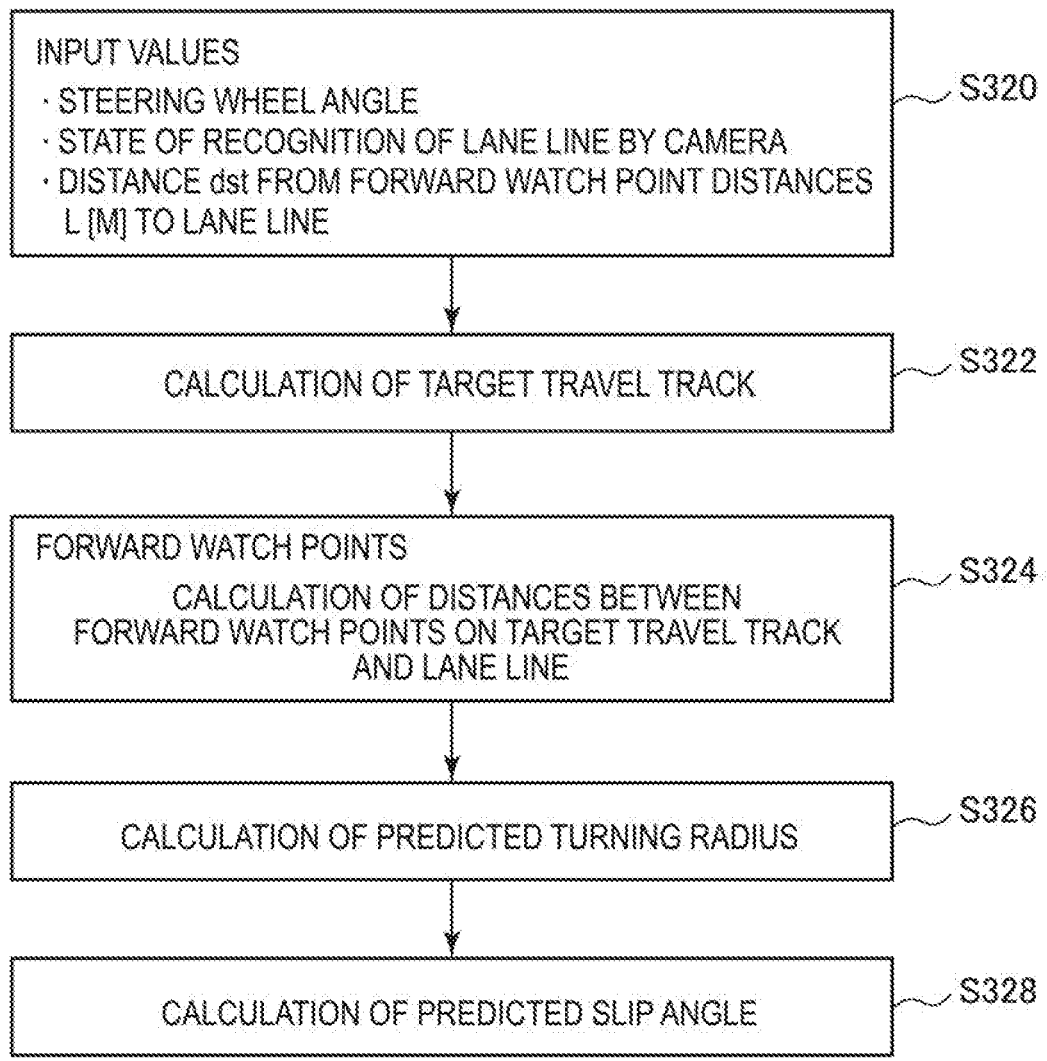
FIG. 16 is a flowchart illustrating processing for a predicted turning radius calculator to calculate a predicted turning radius tgtRcam, and for a predicted slip angle calculator to calculate a predicted slip angle tgtβcam.
Figure 17:
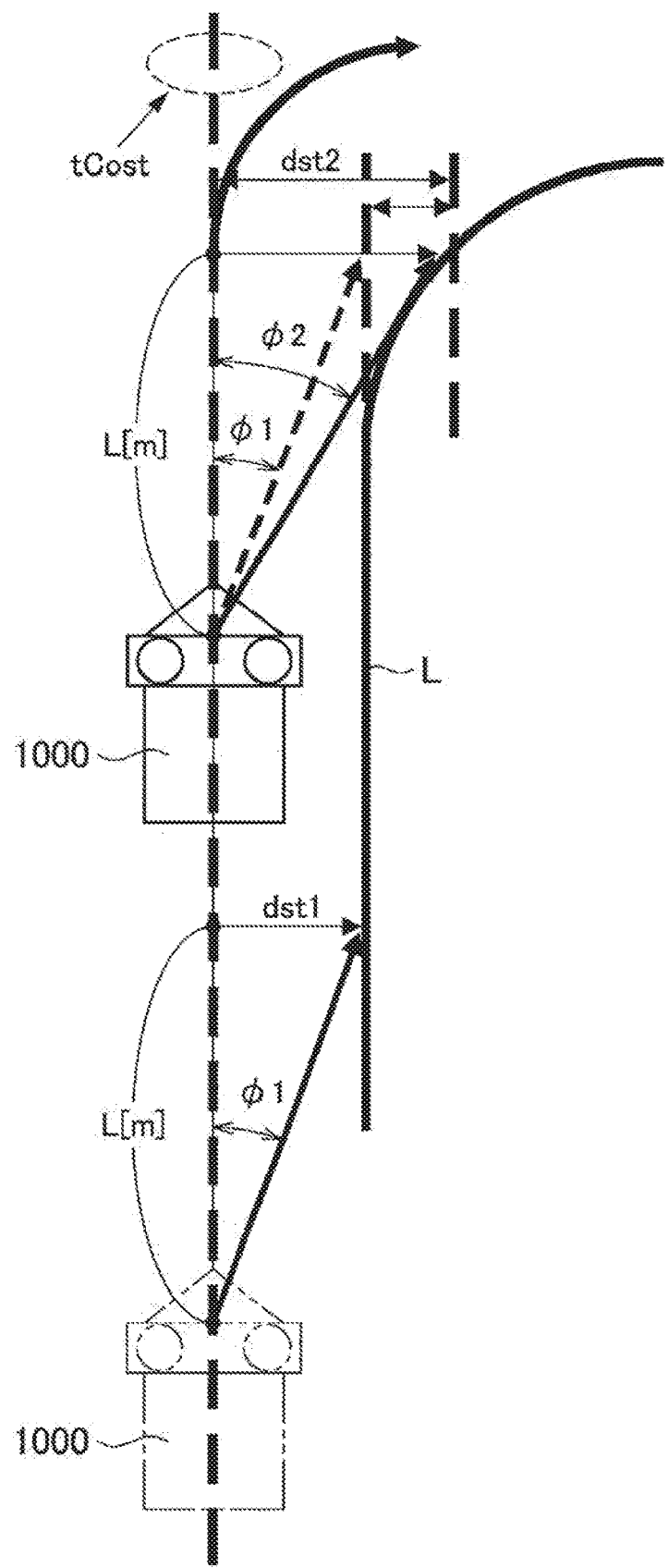
FIG. 17 is a schematic overhead view of a vehicle and a lane taken from above the vehicle.

FIG. 16 is a flowchart illustrating processing for the predicted turning radius calculator 216 to calculate the predicted turning radius tgtRcam, and for the predicted slip angle calculator 218 to calculate the predicted slip angle tgtβcam at steps S204 and S210 of FIG. 13 and steps S242 and S244 of FIG. 14. In addition, FIG. 17 is a schematic overhead view of the vehicle 1000 and a lane taken from above the vehicle 1000, illustrating forward watch view point distances L [m], distances dst1 and dst2 between forward watch points on a target travel track and the lane line, and the target travel track t Cos T. First, at step S320, a steering wheel angle θh, a state of recognition of the lane line on a road surface acquired by the external environment recognizer 202, and the distances dst to the lane line with regard to the forward watch point distances L [m] are acquired as input values.

At the next step S322, the target travel track is calculated. The target travel track t Cos T (tgtCourceTask) is calculated using Eq. below. Note that the target travel track is calculated by the external environment recognizer 202 or the predicted turning radius calculator 216. Further, the target travel track t Cos T can be a straight line extending forwards from the vehicle 1000.

$$TCosT = \left(1 - \frac{m}{2l^2} \frac{l_f K_y - l_y K_y}{K_f K_y} V^2\right) \frac{l}{\theta/n} \quad (32)$$

At the next step S324, the distances dst1 and dst2 between the forward watch points on the target travel track and the lane line are calculated. dst1 and dst2 are calculated from Eqs. below.

dst1=t Cos T1−Cam1 (33)

dst2=t Cos T2−Cam2 (33)

At the next step S326, the predicted turning radius calculator 216 calculates the predicted turning radius tgtR. The predicted turning radius tgtR is calculated from Eqs. below.

Previous value of the round: tan φ1=dst1/L (35)

Current value of the round: tan φ2=dst2/L (36)

φ1=a tan(dst1/L) (37)

φ2=a tan(dst2/L) (38)

addφ=φ2−φ1 (39)

tgt_Yaw_angle=addφ (40)

tgt_add_γ=d/dt(tgt_Yaw_angle) (41)

$$tgt\theta = tgt\_add\_\gamma \times (1 + AV^2) \times \frac{l}{V} \times n \quad (42)$$

$$tgtR = (1 + AV^2) \times \frac{l}{n \times tgt\theta} \quad (43)$$

At the next step S328, the predicted slip angle calculator 218 calculates the predicted slip angle tgtβcam. The predicted slip angle tgtβcam is calculated from Eq. below.

$$tgt\beta cam = \left(1 - \frac{m}{2l} \times \frac{l_f}{l_y K_y} V^2\right) \times \frac{1}{tgtR} \times l_y \quad (44)$$

The calculation of the predicted turning radius tgtRst performed by the predicted turning radius calculator 228 at step S206 of FIG. 13 and step S248 of FIG. 14 can be performed using the same method as the calculation of the predicted turning radius tgtRcam. In this case, the predicted turning radius tgtRcam can be obtained from Eqs. (42) and (43) by obtaining the target yaw rate γ_tgt from Eq. (1) based on the steering wheel angle θh and the vehicle velocity, and substituting γ_tgt for tgt_add_γ of Eq. (42). Furthermore, the predicted slip angle tgtβst can be calculated based on Eq. (44) at step S210 of FIG. 13 and step S250 of FIG. 14.

Figure 18:
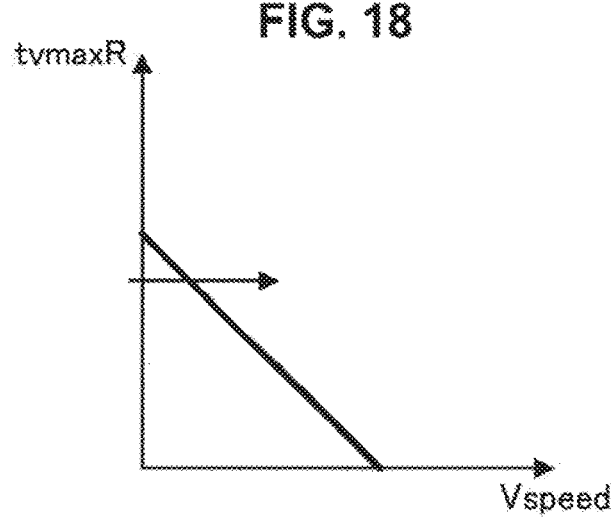
FIG. 18 is a characteristic diagram illustrating a driving force turn critical radius map used when a maximum turning radius calculator calculates a maximum turning radius tvmaxR.

FIG. 18 is a characteristic diagram illustrating a driving force turn critical radius map used when the maximum turning radius calculator 236 calculates the maximum turning radius tvmaxR. As illustrated in FIG. 18, as the vehicle velocity V increases, the maximum turning radius tvmaxR gets smaller.

Figure 19A:
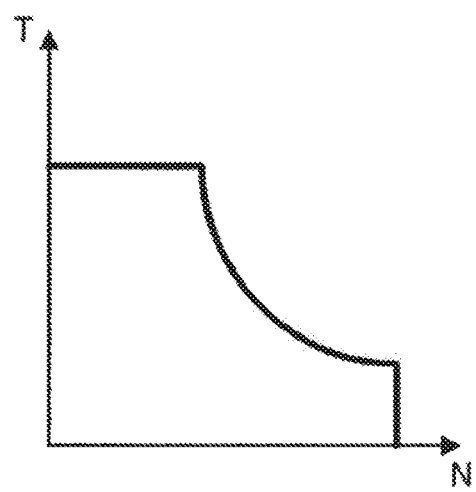
FIG. 19A is a characteristic diagram for describing a flow for creating the map of FIG. 18.
Figure 19B:
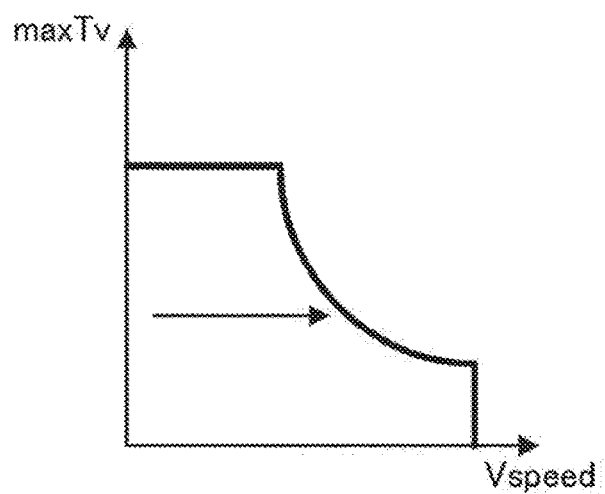
FIG. 19B is a characteristic diagram for describing a flow for creating the map of FIG. 18.

FIGS. 19A to 19D are characteristic diagrams for describing a flow for creating the map of FIG. 18. First, as illustrated in FIG. 19A, a maximum torque according to the number of motor rotations is obtained from the T-N characteristic of the motors. Next, the characteristic of the maximum torque difference between the left and right motors is obtained by converting the horizontal axis of FIG. 19A into the vehicle velocity V according to the gear ratio of the speed reducer and doubling the value of the torque as illustrated in FIG. 19B.

Next, the motor torque of the vertical axis for the characteristic of FIG. 19B is converted into driving force based on the gear ratio and the tire radius, and a turn additional yaw moment [N·m] generated at the center of a turn of the vehicle from treads of the vehicle is calculated. A yaw angle acceleration is calculated by dividing the obtained turn additional yaw moment by a yaw inertial moment of the vehicle, and a yaw rate (a yaw angular speed) is obtained by integrating the obtained yaw angular speed. Accordingly, the map of the yaw rate obtained through left-right driving force distribution control with respect to vehicle velocity V is obtained as illustrated in FIG. 19C.

Figure 19C:
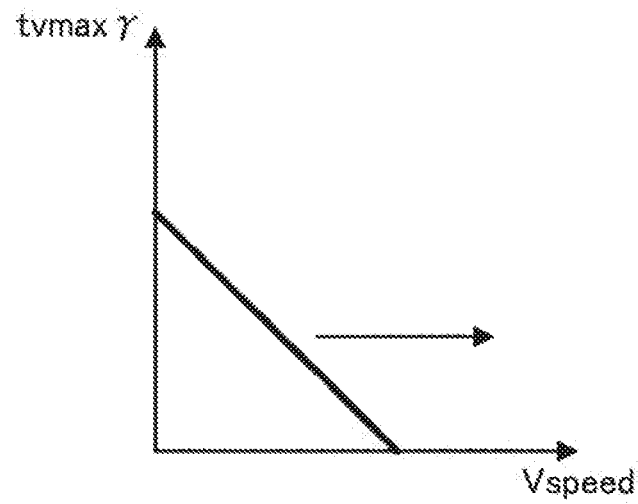
FIG. 19C is a characteristic diagram for describing a flow for creating the map of FIG. 18.

Next, a steering wheel angle is obtained from the yaw rate and the vehicle velocity V obtained from the characteristic of FIG. 19C based on Eq. (45) below. Accordingly, the map of FIG. 19D is obtained.

$$\gamma = \frac{1}{1 + Ts} \frac{1}{(1 + AV^2)} \frac{V}{l} \delta \quad (45)$$

Ts: Yaw rate/Constant of a steering operation

Figure 19D:
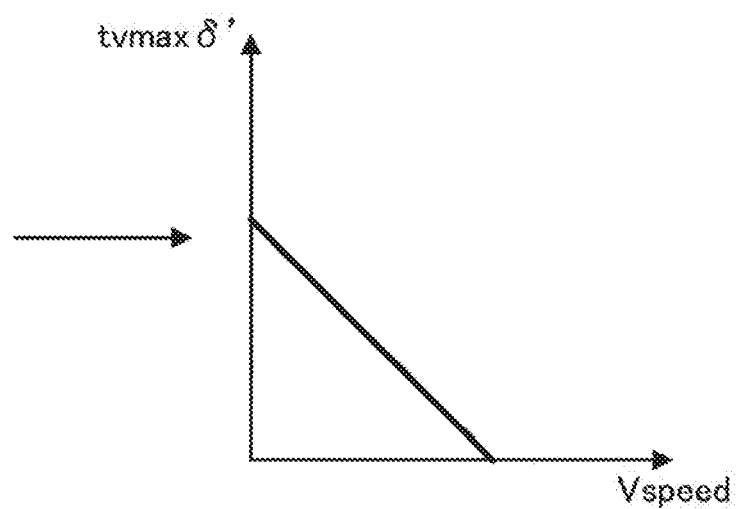
FIG. 19D is a characteristic diagram for describing a flow for creating the map of FIG. 18.

Next, the turning radius is obtained from a steering wheel angle θh obtained from the characteristic of FIG. 19D based on Eq. (43). Accordingly, the map of FIG. 18 can be obtained. Thus, the maximum turning radius calculator 236 can calculate the maximum turning radius tvmaxR based on the map of FIG. 18.

Figure 20A:
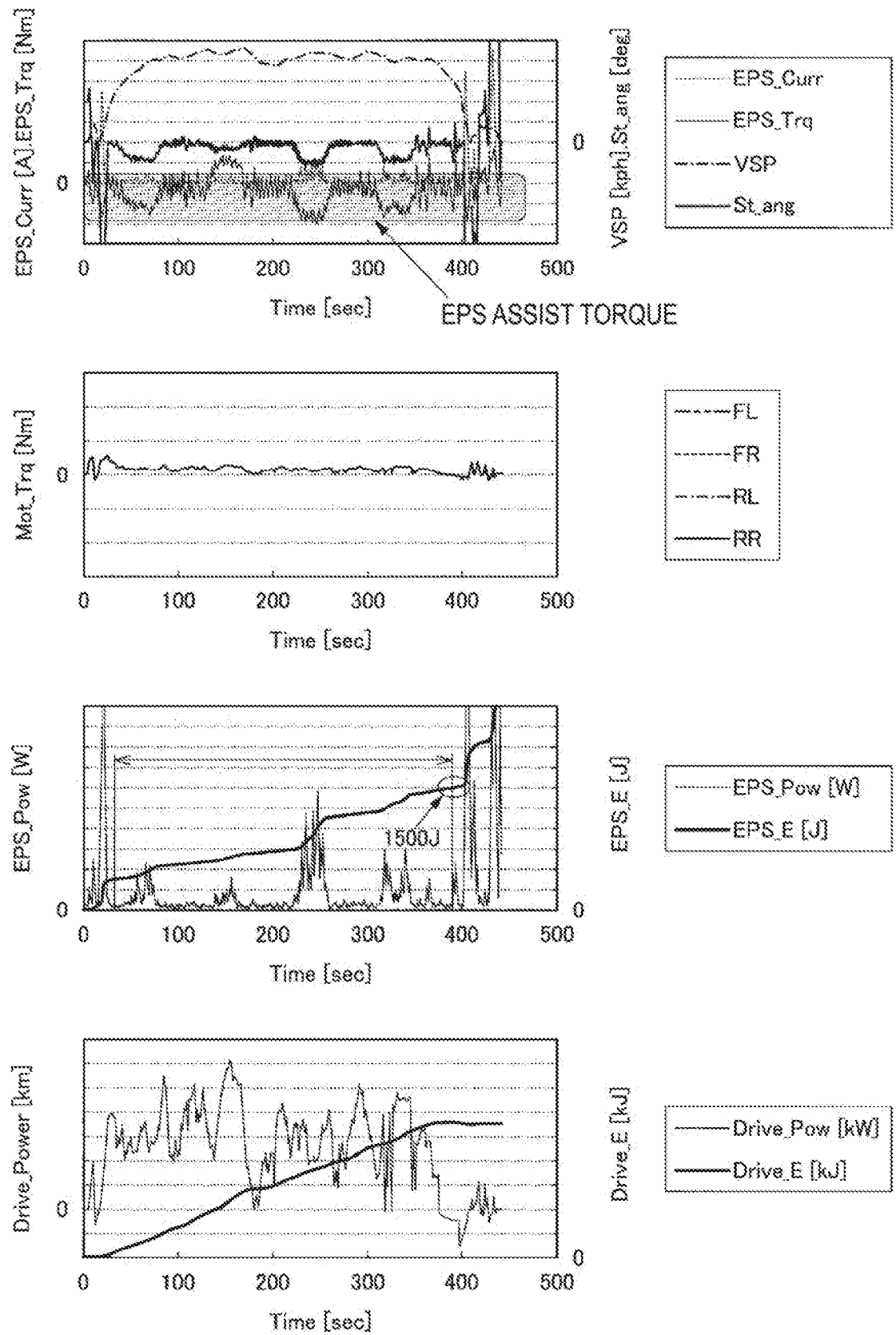
FIG. 20A is a characteristic diagram for describing an advantageous effect brought about by control according to the present implementation.
Figure 20B:
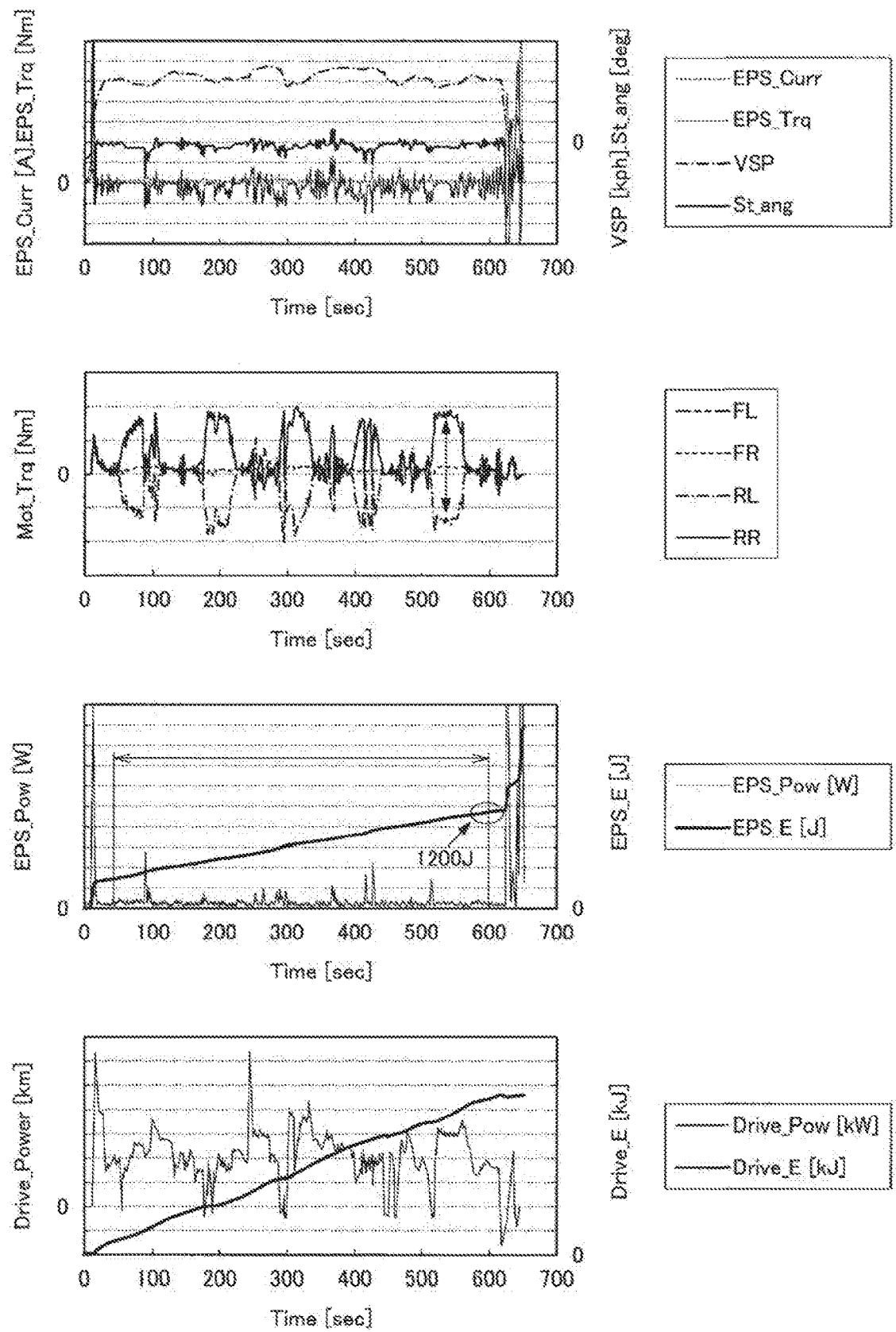
FIG. 20B is a characteristic diagram for describing an advantageous effect brought about by control according to the present implementation.

FIGS. 20A and 20B are characteristic diagrams for describing an advantageous effect brought about by control according to the present implementation. Here, FIG. 20A illustrates the state of a steering operation performed by the electric power steering motor 1060, and FIG. 20B illustrates the state of a steering operation based on driving force control using the difference between left and right driving forces of the motors 108, 110, 112, and 114. In FIGS. 20A and 20B, EPS_Curr represents the current of the electric power steering motor 1060, EPS_Trq represents the torque of the electric power steering motor 1060, VSP represents vehicle velocity, St_ang represents the steering wheel angle, Mot_Trq represents the torque of the motors 108, 110, 112, and 114, EPS_Pow represents the output of the electric power steering motor 1060, EPS_E represents energy of the electric power steering motor 1060, Drive_Pow represents the output of the motors 108, 110, 112, and 114, and Drive_E represents energy of the motors 108, 110, 112, and 114.

As is obvious from comparison of FIGS. 20A and 20B, it is ascertained that, by obtaining turning performance with driving forces through left-right driving force control based on the vehicle velocity and the predicted turning radius, the output of the electric power steering motor 1060 (EPS_Pow) and the energy of the electric power steering motor 1060 (EPS_E) can reduce and a load of 12 V can decrease.

With regard to energy consumption of 12 V at the time of traveling 1 kilometer under a constant condition, 650 J was consumed in a steering operation and 600 J was consumed in a drive steering operation, making a difference of 50 J. The third drawings from the top of FIGS. 20A and 20B illustrate data obtained when the vehicle continuously traveled about 6 kilometers. The consumed energy was 1500 J in the steering operation, and 1200 J in the drive steering operation, making a difference of 300 J. Furthermore, it is possible to minimize energy loss by detecting and controlling a slip.

According to the present implementation described above, when the amount of charge of the high-voltage battery 1040 lowers, steering assist is carried out using the torque of the electric power steering motor 1060. Thus, it is possible to reliably eliminate a possibility of turn assist control, which is performed based on driving force control using the difference between left and right driving forces, not being realized, which can be caused by lowering of the amount of charge of the high-voltage battery 1040, while a turn is made using the difference between left and right driving forces from the motors 108, 110, 112, and 114.

Further, when a slip angle change rate is high, driving force control to be performed by using the difference between left and right driving forces generated from the motors 108, 110, 112, and 114 is frequently performed. Thus, by switching control to steering assist using the torque of the electric power steering motor 1060, behaviors of the vehicle can be stabilized, and therefore drivability can be improved.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

According to the present invention described above, it is possible to achieve a desired turn even if the amount of charge of a battery for performing turning driving force control lowers, which uses the difference between left and right driving forces.

The invention claimed is:

1. A control unit for a vehicle, the control unit comprising:
  a vehicle additional yaw moment calculator that is configured to calculate a vehicle additional yaw moment to be applied to a vehicle based on a yaw rate of the vehicle;
  a steering torque instructing module that is configured to instruct an assist torque of a steering operation of a steering system;
  a left-right driving force torque instructing module that is configured to instruct a left-right wheel driving torque which applies a moment to the vehicle independently of the steering system;
  a charging state acquisition module that is configured to acquire a state of charge of a battery which stores an electric power serving as a driving source for applying the vehicle additional yaw moment;
  a predicted slip angle calculator that is configured to calculate a predicted slip angle of the vehicle;
  a turnable slip angle calculator that is configured to calculate a turnable slip angle based on a maximum turning radius obtained from driving forces of wheels to apply the vehicle additional yaw moment;
  a slip angle change rate calculator that is configured to calculate a slip angle change rate that is a ratio of the predicted slip angle to the turnable slip angle; and
  an adjuster that is configured to adjust the assist torque and the left-right wheel driving torque based on the state of charge and the slip angle change rate to apply the vehicle additional yaw moment.

2. The control unit for a vehicle according to claim 1, wherein the adjuster reduces the left-right wheel driving torque and increases the assist torque as an amount of charge of the battery lowers.

3. The control unit for a vehicle according to claim 2, wherein the adjuster sets the left-right wheel driving torque to 0 when the amount of charge of the battery is equal to or lower than a determined value.

4. The control unit for a vehicle according to claim 1, wherein the adjuster reduces the left-right wheel driving torque and increases the assist torque as the slip angle change rate increases.

5. The control unit for a vehicle according to claim 4, wherein, when the slip angle change rate is equal to or higher than a determined first value and an amount of charge of the battery is equal to or greater than a determined second value, the adjuster sets the left-right wheel driving torque among torques for applying the vehicle additional yaw moment as an outputtable maximum torque, and sets a remaining as the assist torque.

6. The control unit for a vehicle according to claim 1, wherein
  the predicted slip angle calculator includes a first predicted slip angle calculator that is configured to calculate a first predicted slip angle based on a first predicted turning radius calculated based on a lane detected by a camera, and
  a second predicted slip angle calculator that is configured to calculate a second predicted slip angle based on a second predicted turning radius calculated based on a steering wheel angle,
  the slip angle change rate calculator includes a first slip angle change rate calculator that is configured to calculate a first slip angle change rate that is a ratio of the first predicted slip angle to the turnable slip angle, and
  a second slip angle change rate calculator that is configured to calculate a second slip angle change rate that is a ratio of the second predicted slip angle to the turnable slip angle,
  the control unit further includes a slip angle change rate determiner that is configured to:
    compare the first slip angle change rate and the second slip angle change rate; and
    determine a higher rate as the slip angle change rate, wherein the higher rate is determined based on the comparison of the first slip angle change rate and the second slip angle change rate, and
  the adjuster adjusts the assist torque and the left-right wheel driving torque based on the state of charge and the slip angle change rate determined by the slip angle change rate determiner.

7. The control unit for a vehicle according to claim 1, further comprising
a slip determiner that is configured to determine a slip of the vehicle,
wherein, when the vehicle is determined to have slipped, the adjuster reduces the left-right wheel driving torque and increases the assist torque.

8. The control unit for a vehicle according to claim 1, further comprising:
a target yaw rate calculator that is configured to calculate a target yaw rate of the vehicle;
a vehicle yaw rate calculator that is configured to calculate a yaw rate model value from a vehicle model;
a yaw rate sensor that is configured to detect an actual yaw rate of the vehicle; and
a feedback yaw rate calculator that is configured to calculate a feedback yaw rate from the yaw rate model value and the actual yaw rate by distributing the yaw rate model value and the actual yaw rate based on a difference between the yaw rate model value and the actual yaw rate,
wherein the vehicle additional yaw moment calculator is further configured to calculate the vehicle additional yaw moment based on a difference between the target yaw rate and the feedback yaw rate.

9. The control unit for a vehicle according to claim 8,
wherein the target yaw rate calculator includes a first target yaw rate calculator that is configured to calculate a first target yaw rate from an image of a camera and a second target yaw rate calculator that is configured to calculate a second target yaw rate based on a steering wheel angle and a vehicle velocity, and is configured to calculate the target yaw rate based on the first target yaw rate and the second target yaw rate.

10. A control method for a vehicle, the control method comprising:
calculating a vehicle additional yaw moment to be applied to a vehicle based on a yaw rate of the vehicle;
instructing an assist torque of a steering operation of a steering system;
instructing a left-right wheel driving torque which applies a moment to the vehicle independently of the steering system;
acquiring a state of charge of a battery which stores an electric power serving as a driving source for applying the vehicle additional yaw moment;
calculating a predicted slip angle of the vehicle;
calculating a turnable slip angle based on a maximum turning radius obtained from driving forces of wheels to apply the vehicle additional yaw moment;
calculating a slip angle change rate that is a ratio of the predicted slip angle to the turnable slip angle; and
adjusting the assist torque and the left-right wheel driving torque based on the state of charge and the slip angle change rate to apply the vehicle additional yaw moment.

11. A control unit for a vehicle, the control unit comprising;
circuitry configured to:
calculate a vehicle additional yaw moment to be applied to a vehicle based on a yaw rate of the vehicle;
instruct an assist torque of a steering operation of a steering system;
instruct a left-right wheel driving torque which applies a moment to the vehicle independently of the steering system;
acquire a state of charge of a battery which stores an electric power serving as a driving source for applying the vehicle additional yaw moment;
calculate a predicted slip angle of the vehicle;
calculate a turnable slip angle based on a maximum turning radius obtained from driving forces of wheels to apply the vehicle additional yaw moment;
calculate a slip angle change rate that is a ratio of the predicted slip angle to the turnable slip angle; and
adjust the assist torque and the left-right wheel driving torque based on the state of charge and the slip angle change rate to apply the vehicle additional yaw moment.

* * * * *